(12) United States Patent
Abe

(10) Patent No.: US 7,627,144 B2
(45) Date of Patent: Dec. 1, 2009

(54) METHOD AND APPARATUS FOR PERFORMING IDENTITY AUTHENTICATION

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 534 days.

(21) Appl. No.: 11/204,528

(22) Filed: Aug. 16, 2005

(65) Prior Publication Data

US 2006/0115129 A1 Jun. 1, 2006

(30) Foreign Application Priority Data

Aug. 19, 2004 (JP) ............................ P2004-239439
Jan. 19, 2005 (JP) ............................ P2005-012037

(51) Int. Cl.
*G06K 9/00* (2006.01)

(52) U.S. Cl. ..................................................... 382/115

(58) Field of Classification Search ......... 382/115–127, 382/278; 351/200–204; 340/5.1–5.92
See application file for complete search history.

(56) References Cited

U.S. PATENT DOCUMENTS 4,407,299 A * 10/1983 Culver ........................ 600/544
5,941,820 A *  8/1999 Zimmerman ................ 600/300

| | | | | |
|---|---|---|---|---|
| 2002/0118864 | A1 | 8/2002 | Kondo et al. | |
| 2003/0051147 | A1* | 3/2003 | Maeda et al. | 713/186 |
| 2004/0034479 | A1* | 2/2004 | Shimase et al. | 702/19 |
| 2008/0040614 | A1* | 2/2008 | Abe | 713/186 |

FOREIGN PATENT DOCUMENTS

| | | |
|---|---|---|
| JP | 2002-259981 | 9/2002 |
| JP | 2003-044832 | 2/2003 |
| JP | 2003-067340 | 3/2003 |
| JP | 2003-99780 A | 4/2003 |
| JP | 3439359 B | 6/2003 |

OTHER PUBLICATIONS

Japanese Office Action issued on Feb. 5, 2008 in connection with Japanese Patent Application No. 2004-239439.

* cited by examiner

*Primary Examiner*—Bhavesh M Mehta
*Assistant Examiner*—Atiba O Fitzpatrick
(74) *Attorney, Agent, or Firm*—Sonnenschein Nath Rosenthal LLP

(57) ABSTRACT

An authentication apparatus compares a value of correlation between inspection characteristic data of an organism acquired from the organism to be inspected and reference data associated with a predetermined organism with a predetermined threshold associated with said predetermined organism to perform authentication on whether said organism to be inspected is said predetermined organism or not.

2 Claims, 24 Drawing Sheets

TABLE

| NORMAL DISTRIBUTION | z | 0 | 1 | 2 | 3 | 4 | 5 | 6 | 7 | 8 | 9 |
|---|---|---|---|---|---|---|---|---|---|---|---|
| σ | 0.0 | 0.5 | 0.496011 | 0.492022 | 0.488033 | 0.484047 | 0.480061 | 0.476078 | 0.472097 | 0.468119 | 0.464144 |
| | 0.1 | 0.460172 | 0.456205 | 0.452242 | 0.448283 | 0.44433 | 0.440382 | 0.436441 | 0.432505 | 0.428576 | 0.424655 |
| | 0.2 | 0.42074 | 0.416834 | 0.412936 | 0.409046 | 0.405165 | 0.401294 | 0.397432 | 0.39358 | 0.389739 | 0.385908 |
| | 0.3 | 0.382089 | 0.378281 | 0.374484 | 0.3707 | 0.366928 | 0.363169 | 0.359424 | 0.355691 | 0.351973 | 0.348268 |
| | 0.4 | 0.344578 | 0.340903 | 0.337243 | 0.333598 | 0.329969 | 0.326355 | 0.322758 | 0.319178 | 0.315614 | 0.312067 |
| | 0.5 | 0.308538 | 0.305026 | 0.301532 | 0.298056 | 0.294598 | 0.29116 | 0.28774 | 0.284339 | 0.280957 | 0.277595 |
| | 0.6 | 0.274253 | 0.270931 | 0.267629 | 0.264347 | 0.261086 | 0.257846 | 0.254627 | 0.251429 | 0.248252 | 0.245097 |
| | 0.7 | 0.241964 | 0.238852 | 0.235762 | 0.232695 | 0.22965 | 0.226627 | 0.223627 | 0.22065 | 0.217695 | 0.214764 |
| | 0.8 | 0.211855 | 0.20897 | 0.206108 | 0.203269 | 0.200454 | 0.197662 | 0.194894 | 0.19215 | 0.18943 | 0.186733 |
| | 0.9 | 0.18406 | 0.181411 | 0.178786 | 0.176186 | 0.173609 | 0.171056 | 0.168528 | 0.166023 | 0.163543 | 0.161087 |
| | 1 | 0.158655 | 0.156248 | 0.153864 | 0.151505 | 0.14917 | 0.146859 | 0.144572 | 0.14231 | 0.140071 | 0.137857 |
| 2σ | 1.1 | 0.135666 | 0.1335 | 0.131357 | 0.129238 | 0.127143 | 0.125072 | 0.123024 | 0.121001 | 0.119 | 0.117023 |
| | 1.2 | 0.11507 | 0.11314 | 0.111233 | 0.109349 | 0.107488 | 0.10565 | 0.103835 | 0.102042 | 0.100273 | 0.098525 |
| | 1.3 | 0.096801 | 0.095098 | 0.093418 | 0.091759 | 0.090123 | 0.088508 | 0.086915 | 0.085344 | 0.083793 | 0.082264 |
| | 1.4 | 0.080757 | 0.07927 | 0.077804 | 0.076359 | 0.074934 | 0.073529 | 0.072145 | 0.070781 | 0.069437 | 0.068112 |
| | 1.5 | 0.066807 | 0.065522 | 0.064256 | 0.063008 | 0.06178 | 0.060571 | 0.05938 | 0.058208 | 0.057053 | 0.055917 |
| | 1.6 | 0.054799 | 0.053699 | 0.052616 | 0.051551 | 0.050503 | 0.049471 | 0.048457 | 0.04746 | 0.046479 | 0.045514 |
| | 1.7 | 0.044565 | 0.043633 | 0.042716 | 0.041815 | 0.040929 | 0.040059 | 0.039204 | 0.038364 | 0.037538 | 0.036727 |
| | 1.8 | 0.03593 | 0.035148 | 0.034379 | 0.033625 | 0.032884 | 0.032157 | 0.031443 | 0.030742 | 0.030054 | 0.029379 |
| | 1.9 | 0.028716 | 0.028067 | 0.027429 | 0.026803 | 0.02619 | 0.025588 | 0.024998 | 0.024419 | 0.023852 | 0.023295 |
| | 2 | 0.02275 | 0.022216 | 0.021692 | 0.021178 | 0.020675 | 0.020182 | 0.019699 | 0.019226 | 0.018763 | 0.018309 |
| 3σ | 2.1 | 0.017864 | 0.017429 | 0.017003 | 0.016586 | 0.016177 | 0.015778 | 0.015386 | 0.015003 | 0.014629 | 0.014262 |
| | 2.2 | 0.013903 | 0.013553 | 0.013209 | 0.012874 | 0.012545 | 0.012224 | 0.01191 | 0.011604 | 0.011304 | 0.011011 |
| | 2.3 | 0.010724 | 0.010444 | 0.01017 | 0.009903 | 0.009642 | 0.009387 | 0.009137 | 0.008894 | 0.008656 | 0.008424 |
| | 2.4 | 0.008198 | 0.007976 | 0.00776 | 0.007549 | 0.007344 | 0.007143 | 0.006947 | 0.006756 | 0.006569 | 0.006387 |
| | 2.5 | 0.00621 | 0.006037 | 0.005868 | 0.005703 | 0.005543 | 0.005386 | 0.005234 | 0.005085 | 0.00494 | 0.004799 |
| | 2.6 | 0.004661 | 0.004527 | 0.004397 | 0.004269 | 0.004145 | 0.004025 | 0.003907 | 0.003793 | 0.003681 | 0.003573 |
| | 2.7 | 0.003467 | 0.003364 | 0.003264 | 0.003167 | 0.003072 | 0.00298 | 0.00289 | 0.002803 | 0.002718 | 0.002635 |
| | 2.8 | 0.002555 | 0.002477 | 0.002401 | 0.002327 | 0.002256 | 0.002186 | 0.002118 | 0.002052 | 0.001988 | 0.001926 |
| | 2.9 | 0.001866 | 0.001807 | 0.00175 | 0.001695 | 0.001641 | 0.001589 | 0.001538 | 0.001489 | 0.001441 | 0.001395 |
| | 3 | 0.00135 | 0.001306 | 0.001264 | 0.001223 | 0.001183 | 0.001144 | 0.001107 | 0.00107 | 0.001035 | 0.001001 |
| 4σ | 3.1 | 0.000968 | 0.000936 | 0.000904 | 0.000874 | 0.000845 | 0.000816 | 0.000789 | 0.000762 | 0.000736 | 0.000711 |
| | 3.2 | 0.000687 | 0.000664 | 0.000641 | 0.000619 | 0.000598 | 0.000577 | 0.000557 | 0.000538 | 0.000519 | 0.000501 |
| | 3.3 | 0.000483 | 0.000467 | 0.00045 | 0.000434 | 0.000419 | 0.000404 | 0.00039 | 0.000376 | 0.000362 | 0.00035 |
| | 3.4 | 0.000337 | 0.000325 | 0.000313 | 0.000302 | 0.000291 | 0.00028 | 0.00027 | 0.00026 | 0.000251 | 0.000242 |
| | 3.5 | 0.000233 | 0.000224 | 0.000216 | 0.000208 | 0.0002 | 0.000193 | 0.000185 | 0.000179 | 0.000172 | 0.000165 |
| | 3.6 | 0.000159 | 0.000153 | 0.000147 | 0.000142 | 0.000136 | 0.000131 | 0.000126 | 0.000121 | 0.000117 | 0.000112 |
| | 3.7 | 0.000108 | 0.000104 | 0.0001 | 9.58E-05 | 9.2E-05 | 8.84E-05 | 8.5E-05 | 8.16E-05 | 7.84E-05 | 7.53E-05 |
| | 3.8 | 7.24E-05 | 6.95E-05 | 6.67E-05 | 6.41E-05 | 6.15E-05 | 5.91E-05 | 5.67E-05 | 5.44E-05 | 5.22E-05 | 5.01E-05 |
| | 3.9 | 4.81E-05 | 4.62E-05 | 4.43E-05 | 4.25E-05 | 4.08E-05 | 3.91E-05 | 3.75E-05 | 3.6E-05 | 3.45E-05 | 3.31E-05 |
| | 4 | 3.17E-05 | 3.04E-05 | 2.91E-05 | 2.79E-05 | 2.67E-05 | 2.56E-05 | 2.45E-05 | 2.35E-05 | 2.25E-05 | 2.16E-05 |
| 5σ | 4.1 | 2.07E-05 | 1.98E-05 | 1.9E-05 | 1.81E-05 | 1.74E-05 | 1.66E-05 | 1.59E-05 | 1.52E-05 | 1.46E-05 | 1.4E-05 |
| | 4.2 | 1.34E-05 | 1.28E-05 | 1.22E-05 | 1.17E-05 | 1.12E-05 | 1.07E-05 | 1.02E-05 | 9.78E-06 | 9.35E-06 | 8.94E-06 |
| | 4.3 | 8.55E-06 | 8.17E-06 | 7.81E-06 | 7.46E-06 | 7.13E-06 | 6.81E-06 | 6.51E-06 | 6.22E-06 | 5.94E-06 | 5.67E-06 |
| | 4.4 | 5.42E-06 | 5.17E-06 | 4.94E-06 | 4.72E-06 | 4.5E-06 | 4.3E-06 | 4.1E-06 | 3.91E-06 | 3.74E-06 | 3.56E-06 |
| | 4.5 | 3.4E-06 | 3.24E-06 | 3.09E-06 | 2.95E-06 | 2.82E-06 | 2.68E-06 | 2.56E-06 | 2.44E-06 | 2.33E-06 | 2.22E-06 |
| | 4.6 | 2.11E-06 | 2.02E-06 | 1.92E-06 | 1.83E-06 | 1.74E-06 | 1.66E-06 | 1.58E-06 | 1.51E-06 | 1.44E-06 | 1.37E-06 |
| | 4.7 | 1.3E-06 | 1.24E-06 | 1.18E-06 | 1.12E-06 | 1.07E-06 | 1.02E-06 | 9.69E-07 | 9.22E-07 | 8.78E-07 | 8.35E-07 |
| | 4.8 | 7.94E-07 | 7.56E-07 | 7.19E-07 | 6.84E-07 | 6.5E-07 | 6.18E-07 | 5.88E-07 | 5.59E-07 | 5.31E-07 | 5.05E-07 |
| | 4.9 | 4.8E-07 | 4.56E-07 | 4.33E-07 | 4.12E-07 | 3.91E-07 | 3.72E-07 | 3.53E-07 | 3.35E-07 | 3.18E-07 | 3.02E-07 |
| | 5 | 2.87E-07 | 2.73E-07 | 2.59E-07 | 2.46E-07 | 2.33E-07 | 2.21E-07 | 2.1E-07 | 1.99E-07 | 1.89E-07 | 1.79E-07 |

FIG. 15

METHOD AND APPARATUS FOR PERFORMING IDENTITY AUTHENTICATION

CROSS REFERENCES TO RELATED APPLICATIONS

The present invention contains subject matter related to Japanese Patent Application JP2004-239439 and JP2005-012037 filed in the Japanese Patent Office on Aug. 19, 2004 and Jan. 19, 2005, respectively, the entire contents of which being incorporated herein by reference.

BACKGROUND OF THE INVENTION

1. Field of the Invention

The present invention relates to an authentication apparatus authenticating an organism based on a characteristic amount acquired from the organism, and a method thereof.

2. Description of the Related Art

In communication systems communicating via a network and predetermined processing apparatuses, authentication may be performed on whether the user is authorized or not.

For such authentication, there is, for example, biological authentication in which biological data of a fingerprint, a vein and the like is read from a user, and authentication is performed based on a value of correlation between inspection characteristic data showing a characteristic specific to the user extracted from the biological data and reference characteristic data held in advance.

In such biological authentication, how to determine a threshold of a correlation value used as a criterion for determining whether the user is the genuine person or a different person is important in achievement of high reliability.

That is, a false acceptance rate (FAR) being a probability of erroneously determining a different person to be the genuine person and a false rejection rate (FRR) being a probability of erroneously determining the genuine person to be a different person are determined according to how the threshold is determined.

Methods for determining the threshold include various methods such as a method shown in, for example, Patent Document 1: Japanese Patent No. 3439359.

In this type of authentication apparatus, if an image pickup device or identification object itself is slightly changed with age, the state of a distribution of similarity degrees (checking results), which is determined to be an identification object (hereinafter referred to as similarity distribution), changes according to the change with age.

Specifically, given that ideal states of a similarity distribution when the degree of similarity between reference characteristic data and inspection characteristic data ranges from "0" to "1", and the threshold is "0.6", and a distribution of similarity degrees, which is determined to be not an identification object (hereinafter referred to as non-similarity distribution), are the states shown in, for example, FIG. 22, the similarity distribution goes into various states such that its average decreases as shown in, for example, FIG. 23, the distribution generally shifts toward the threshold as shown in, for example, FIG. 24, and its peak does not change but its slope becomes gentle although not shown in the figure, according to a slight change with age.

As such a change with age increases, the similarity distribution progressively shifts to a domain smaller than the threshold, and therefore in the authentication apparatus, the probability of determining a registered identification object to be a different identification object (i.e. False Rejection Ratio (FRR)) increases, resulting in a degradation in reliability of improving authentication accuracy.

As one method of countermeasures against this problem, there is a method in which independently of a threshold serving as a criterion of determining whether the object is an identification object or not, a range between an update range lower threshold and an update range upper threshold is set as an update range, whether or not the similarity degree is within the set update range is determined every time authentication is performed, and when the similarity degree is within the update range, reference characteristic data is updated (see, for example, Patent Document 1: Japanese Patent Laid-Open No. 2004-157602 (FIG. 5)).

SUMMARY OF THE INVENTION

The reliability of the above-mentioned authentication apparatus depends on how to determine the above-mentioned threshold.

Currently, there is a request for further improving the reliability of authentication by the above-mentioned authentication apparatus.

In addition, there is a request for realizing a desired false acceptance rate (FAR) and a false rejection rate (FRR) according to characteristics of a service using authentication, and the like.

The reliability of the above-mentioned authentication system also depends on a method for updating reference characteristic data. In the method of Patent Document 2 described above, whether or not the similarity degree is within the fixed update range independent of the threshold is determined every time authentication is performed, and therefore a situation may occur in which reference characteristic data is updated not just for a permanent change like a change with age of an image pickup device or identification object but for a temporary change such as, for example, variations in image pickup state, such that the similarity degree equals a threshold or greater, but is within the update range, thus raising a problem such that the number of updates of the reference characteristic data increases, and hence the reliability of reference characteristic data is compromised.

Particularly, if the identification object is a blood vessel or the like existing in an organism, a temporary change similar to variations in image pickup state tends to occur frequently due to a physiological change such as an increase or decrease in amount of fat in the organism, and therefore such a problem is expected to be actualized.

For solving the problems of the related art described above, it is desirable to provide an authentication apparatus and an authentication method capable of performing authentication with higher reliability than was previously possible.

In addition, it is desirable to provide an authentication apparatus and an authentication method capable of realizing a desired false acceptance rate or false rejection rate according to characteristics of a service using authentication, and the like.

According to an embodiment of the present invention, an authentication apparatus of a first embodiment of the present invention is an authentication apparatus comparing a value of correlation between inspection characteristic data of an organism acquired from the organism to be inspected and reference data associated with a predetermined organism with a predetermined threshold associated with the predetermined organism to perform authentication on whether the organism to be inspected is the predetermined organism or not, the authentication apparatus comprising: a storage means for storing the threshold specified so that a value obtained by dividing an absolute value of a difference between a first average value of a plurality of first correlation values each generated by detecting correlation with the reference data for a plurality of first characteristic data previously acquired from the predetermined organism and the threshold by a standard deviation of the plurality first correlation values coincides with a value obtained by dividing an absolute value of a difference between a second average value of a plurality of second correlation values each generated by detecting correlation with the reference data for a plurality of second characteristic data previously acquired from an organism other than the predetermined organism and the threshold by the plurality of second correlation values; and an authentication means for comparing the inspection characteristic data with the threshold read from the storage means to perform authentication on whether the organism to be inspected is the predetermined organism or not.

The action of the authentication apparatus of the first embodiment of the present invention is as follows.

The authentication means compares inspection characteristic data with the threshold read from the storage means to perform authentication on whether the organism to be inspected is the predetermined organism or not.

An authentication method of a second embodiment of the present invention is an authentication method for comparing a value of correlation between inspection characteristic data of an organism acquired from the organism to be inspected and reference data associated with a predetermined organism with a predetermined threshold associated with the predetermined organism to perform authentication on whether the organism to be inspected is the predetermined organism or not, the authentication method comprising: a first step of determining the threshold specified so that a value obtained by dividing an absolute value of a difference between a first average value of a plurality of first correlation values each generated by detecting correlation with the reference data for a plurality of first characteristic data previously acquired from the predetermined organism and the threshold by a standard deviation of the plurality first correlation values coincides with a value obtained by dividing an absolute value of a difference between a second average value of a plurality of second correlation values each generated by detecting correlation with the reference data for a plurality of second characteristic data previously acquired from an organism other than the predetermined organism and the threshold by the plurality of second correlation values; and a second step of comparing the inspection characteristic data with the threshold determined in the first step to perform authentication on whether the organism to be inspected is the predetermined organism or not.

An authentication apparatus of a third embodiment of the present invention is an authentication apparatus comparing a value of correlation between inspection characteristic data of an organism acquired from the organism to be inspected and reference data associated with a predetermined organism with a predetermined threshold associated with the predetermined organism to perform authentication on whether the organism to be inspected is the predetermined organism or not, the authentication apparatus comprising: an input means for inputting a false rejection rate showing a probability of authenticating that the organism to be inspected, which is the predetermined organism, is not the predetermined organism; a threshold determining means for determining the threshold so as to meet the false rejection rate input by the input means with the assumption that a plurality of correlation values each generated by detecting correlation with the reference data for a plurality of characteristic data previously acquired from the predetermined organism conforms to a normal distribution; and an authentication means for comparing the value of correlation between the inspection characteristic data and the reference data with the threshold determined by the threshold determining means to perform authentication on whether the organism to be inspected is the predetermined organism or not.

The action of the authentication apparatus of the third embodiment of the present invention is as follows.

The input means inputs a false rejection rate showing a probability of authenticating the organism to be inspected, which is the predetermined organism, is not the predetermined organism.

Then, the threshold determining means determines the threshold so as to meet the false rejection rate input by the input means with the assumption that a plurality of correlation values each generated by detecting correlation with the reference data for a plurality of characteristic data previously acquired from the predetermined organism conforms to a normal distribution.

Then, the authentication means compares the value of correlation between the inspection characteristic data and the reference data with the threshold determined by the threshold determining means to perform authentication on whether the organism to be inspected is the predetermined organism or not.

An authentication method of a fourth embodiment of the present invention is an authentication method for comparing a value of correlation between inspection characteristic data of an organism acquired from the organism to be inspected and reference data associated with a predetermined organism with a predetermined threshold associated with the predetermined organism to perform authentication on whether the organism to be inspected is the predetermined organism or not, the authentication method comprising: a first step of inputting a false rejection rate showing a probability of authenticating that the organism to be inspected, which is the predetermined organism, is not the predetermined organism; a second step determining the threshold so as to meet the false rejection rate input in the first step with the assumption that a plurality of correlation values each generated by detecting correlation with the reference data for a plurality of characteristic data previously acquired from the predetermined organism conforms to a normal distribution; and a third step of comparing the value of correlation between the inspection characteristic data and the reference data with the threshold determined in the second step to perform authentication on whether the organism to be inspected is the predetermined organism or not.

An authentication apparatus of a fifth embodiment of the present invention is an authentication apparatus comparing a value of correlation between inspection characteristic data of an organism acquired from the organism to be inspected and reference data associated with a predetermined organism with a predetermined threshold associated with the predetermined organism to perform authentication on whether the organism to be inspected is the predetermined organism or not, the authentication apparatus comprising: an input means for inputting a false acceptance rate showing a probability of authenticating that the organism to be inspected, which is not the predetermined organism, is the predetermined organism; a threshold determining means for determining the threshold so as to meet the false acceptance rate input by the input means with the assumption that a plurality of correlation values each generated by detecting correlation with the reference data for a plurality of characteristic data previously acquired from the predetermined organism conforms to a normal distribution; and an authentication means for comparing the value of correlation between the inspection characteristic data and the reference data with the threshold determined by the threshold determining means to perform authentication on whether the organism to be inspected is the predetermined organism or not.

The authentication apparatus of the fifth embodiment of the present invention is as follows.

The input means inputs a false acceptance rate showing a probability of authenticating that the organism to be inspected, which is not the predetermined organism, is the predetermined organism.

Then, the threshold determining means determines the threshold so as to meet the false acceptance rate input by the input means with the assumption that a plurality of correlation values each generated by detecting correlation with the reference data for a plurality of characteristic data previously acquired from the predetermined organism conforms to a normal distribution.

Then, the authentication means compares the value of correlation between the inspection characteristic data and the reference data with the threshold determined by the threshold determining means to perform authentication on whether the organism to be inspected is the predetermined organism or not.

An authentication method of a sixth embodiment of the present invention is an authentication method for comparing a value of correlation between inspection characteristic data of an organism acquired from the organism to be inspected and reference data associated with a predetermined organism with a predetermined threshold associated with the predetermined organism to perform authentication on whether the organism to be inspected is the predetermined organism or not, the authentication method comprising: a first step of inputting a false acceptance rate showing a probability of authenticating that the organism to be inspected, which is not the predetermined organism, is the predetermined organism; a second step of determining the threshold so as to meet the false acceptance rate input by the second step with the assumption that a plurality of correlation values each generated by detecting correlation with the reference data for a plurality of characteristic data previously acquired from the predetermined organism conforms to a normal distribution; and a third step of comparing the value of correlation between the inspection characteristic data and the reference data with the threshold determined by the second step to perform authentication on whether the organism to be inspected is the predetermined organism or not.

An authentication apparatus of a seventh embodiment of the present invention comprises: a checking means for checking reference characteristic data registered as information representing an identification object against information to be compared with the reference characteristic data; a holding means for holding as history information a plurality of checking results meeting at least a minimum criterion for determining the object to be the identification object among checking results by checking means; and a detection means for detecting the coming of a time for update of reference characteristic data according to the level of variations of history information with respect to the minimum criterion.

Thus, in this authentication apparatus, a permanent change, rather than a temporary change in the identification object, the image pickup device or the like, can be selectively detected, and therefore reference characteristic data can be appropriately updated.

An update time detection method of an eighth embodiment of the present invention is a method for detecting a time for update of reference characteristic data registered as information representing an identification object, the method comprising: a first step of holding as history information a plurality of checking results meeting at least a minimum criterion for determining the object to be the identification object among results of checking reference characteristic data against information to be compared with the reference characteristic data; and a second step of detecting the coming of a time for update of reference characteristic data according to the level of variations of history information with respect to the minimum criterion.

Thus, in this update time detection method, a permanent change, rather than a temporary change in the identification object, image pickup device or the like, can be selectively detected, and therefore reference characteristic data can be appropriately updated.

A program of a ninth embodiment of the present invention makes an apparatus having a capability of determining whether the result of checking reference characteristic data registered as information representing an identification object against information to be compared with the reference characteristic data meets at least a minimum criterion for determining the object to be the identification object perform: first processing of holding as history information a plurality of checking results meeting at least a minimum criterion among checking results; and second processing of detecting the coming of a time for update of reference characteristic data according to the level of variations of history information with respect to the minimum criterion.

Thus, in this program, a permanent change, rather than a temporary change in the identification object, image pickup device or the like, can be selectively detected, and therefore reference characteristic data can be appropriately updated.

According to the first and second embodiments of the present invention, an authentication apparatus and an authentication method capable of performing authentication with higher reliability than was previously possible can be provided.

According to the third to sixth embodiments of the present invention, an authentication apparatus and an authentication method capable of realizing an input false acceptance rate or false rejection rate can be provided.

According to the seventh to ninth embodiments of the present invention, a plurality of checking results meeting at least a minimum criterion are held as history information, and the coming of a time for update of reference characteristic data is detected according to the level of variations of history information with respect to the minimum criterion, whereby a permanent change, rather than a temporary change in the identification object, image pickup device or the like, can be selectively detected, reference characteristic data can be therefore appropriately updated, and resultantly an authentication apparatus, an update time detection method and a program capable of improving reliability of reference characteristic data can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 15 is a view for explaining normal distribution table data TABLE stored in a memory shown in FIG. 13;

DETAILED DESCRIPTION OF THE PREFERRED EMBODIMENTS

An authentication apparatus according to embodiments of the present invention will be described below.

First Embodiment

This embodiment will be described below with reference to FIGS. 1 to 3.

First, a correspondence between components of this embodiment and components of the present invention will be described.

A memory 18 corresponds to storage means of the first embodiment of the present invention, an authentication section 20 corresponds to the authentication means of the first embodiment of the present invention, and a threshold determining section 22 corresponds to the threshold determining means of the first embodiment of the present invention.

Genuine person sample data Ct1-$n$ corresponds to the first characteristic data of the first embodiment of the present invention, different person sample data Co1-$m$ corresponds to the second characteristic data of the first embodiment of the present invention, correlation data Ft corresponds to the first correlation value of the first embodiment of the present invention, and correlation data Fo corresponds to the second correlation value of the first embodiment of the present invention.

An average value $\mu t$ corresponds to the first average value of the first embodiment of the present invention, and an average value $\mu o$ corresponds to the second average value of the first embodiment of the present invention.

A threshold Xth corresponds to the threshold of the first embodiment of the present invention.

Figure 1:
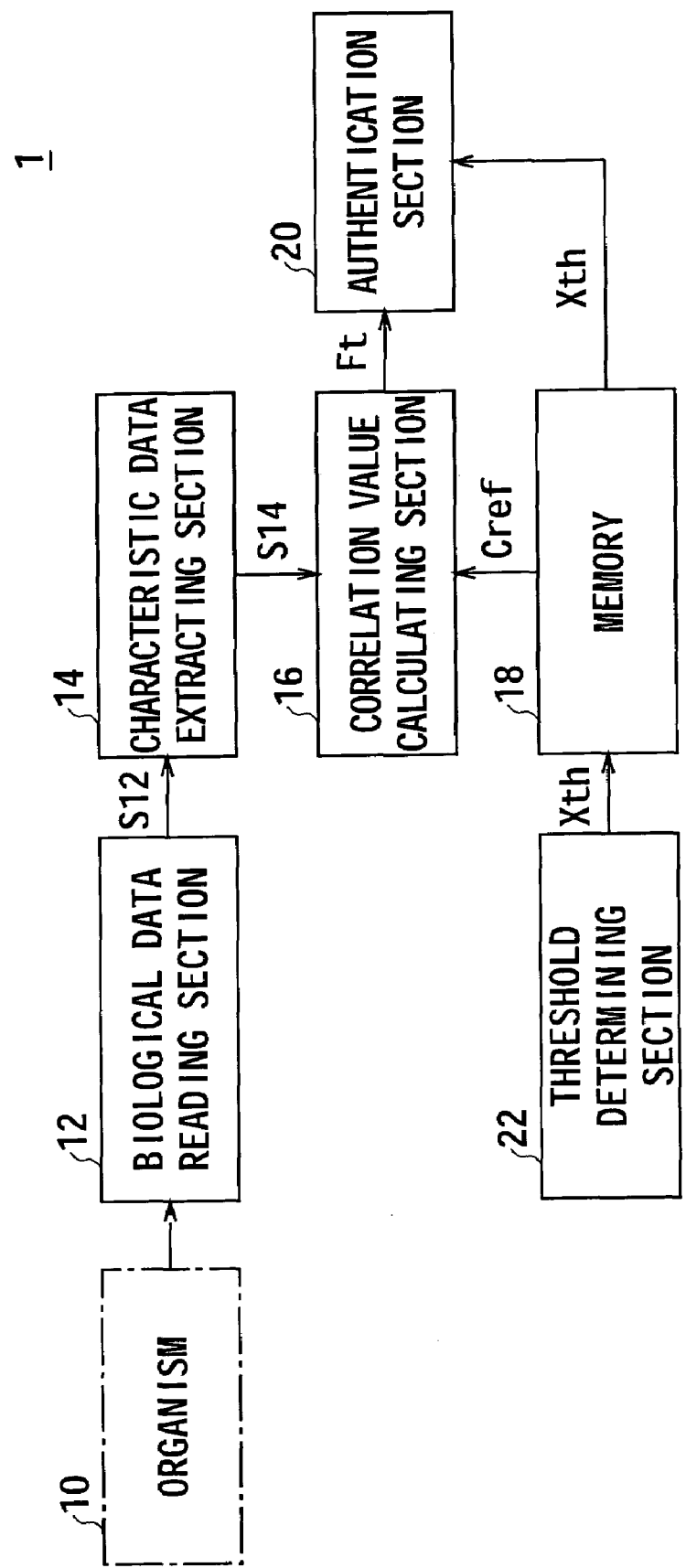
FIG. 1 is a view of a general configuration of an authentication apparatus of a first embodiment of the present invention.

FIG. 1 is a block diagram of an authentication apparatus 1 according to the embodiment of the present invention.

As shown in FIG. 1, the authentication apparatus 1 has, for example, a biological data reading section 12, a characteristic extracting section 14, a correlation value calculating section 16, a memory 18, an authentication section 20 and a threshold determining section 22.

The characteristic extracting section 14, the correlation value calculating section 16, the memory 18, the authentication section 20 and the threshold determining section 22 are implemented by execution of a program by dedicated hardware such as an electronic circuit or a process circuit.

The biological data reading section 12 reads biological data of a fingerprint, vein or the like from an organism 10 such as, for example, a finger of a human, and outputs read biological data S12 to the characteristic extracting section 14.

The characteristic extracting section 14 extracts inspection characteristic data S14 showing a characteristic of, for example, a fingerprint, a branch point or end point of a vein or the like from the biological data S12 input from the biological data reading section 12, and outputs the inspection characteristic data S14 to the correlation value calculating section 16.

The correlation value calculating section 16 detects correlation data Ft showing a value of correlation between the inspection characteristic data S14 input from the characteristic extracting section 14 and reference characteristic data Cref read from the memory 18, and outputs the correlation value to the authentication section 20.

The memory 18 stores the reference characteristic data Cref and a threshold Xth written from the threshold determining section 22.

The authentication section 20 determines whether the correlation value shown by the correlation data Ft input from the correlation value calculating section 16 is larger than the threshold Xth or not, and authenticates that the organism 10 is authorized if determining that the correlation value is larger than the threshold Xth, and authenticates that the organism 10 is not authorized if determining that the correlation value is not larger than the threshold Xth.

The threshold value determining section 22 calculates the threshold value Xth as described below based on genuine person sample data Ct1-$n$ being characteristic data previously acquired from the organism 10 multiple times and different person sample data Co1-$m$ being characteristic data previously acquired from an organism other than the organism 10 (different person), and writes the threshold Xth in the memory 18.

Figure 2:
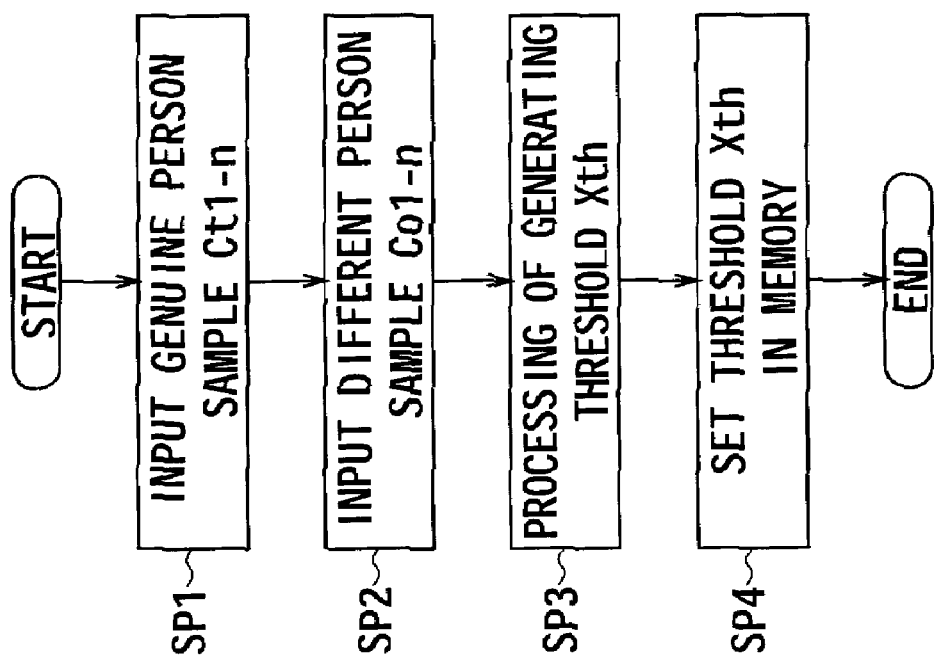
FIG. 2 is a flowchart for explaining processing in a threshold determining section shown in FIG. 1.

FIG. 2 is a flowchart for explaining processing in the threshold determining section 22 shown in FIG. 1.

Step SP1: The threshold determining section 22 inputs the genuine person sample data Ct1-$n$ from another apparatus via the memory 18, network or the like.

Step SP2: The threshold determining section 22 inputs the different person sample data Co1-$m$ from another apparatus via the memory 18, network or the like.

Step SP3: The threshold determining section 22 calculates the threshold Xth based on the genuine sample data Ct1-$n$ input at step SP1 and the different person sample data Co1-$m$ input at step SP2.

Step SP4: The threshold determining section 22 writes (sets) the threshold Xth calculated at step SP3 in the memory 18.

Step SP3 shown in FIG. 2 will be described in detail below.

Figure 3:
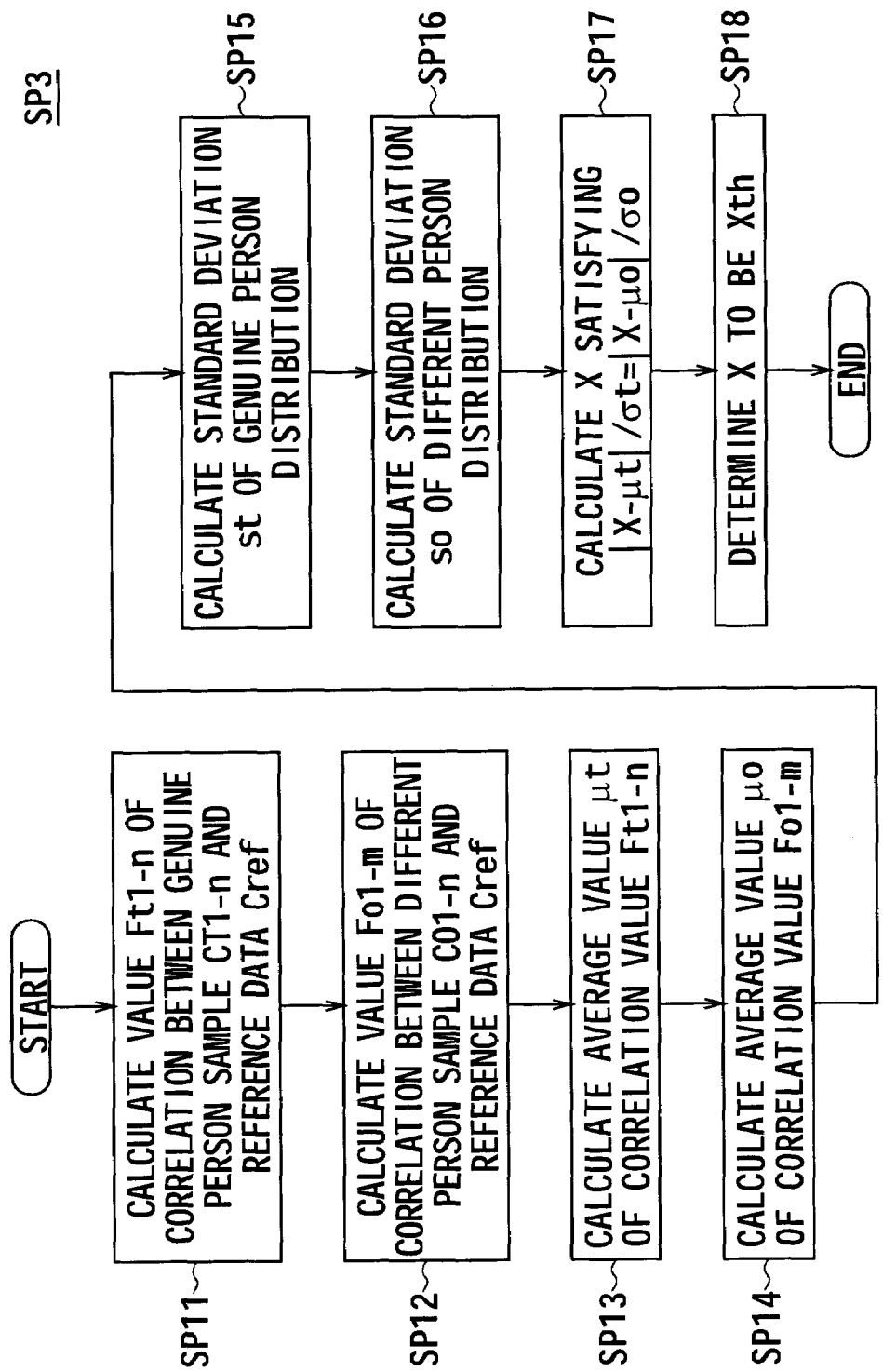
FIG. 3 is a flowchart for explaining processing at step SP3 shown in FIG. 2.

FIG. 3 is a flowchart for explaining step SP3 shown in FIG. 2.

Step SP11: The threshold determining section 22 calculates correlation data Ft1-$n$ showing a value of correlation with the reference characteristic data Cref read from the memory 18 for each of the genuine sample data Ct1-$n$ input at step SP1 shown in FIG. 2.

Step SP12: The threshold determining section 22 calculates correlation data Fo1-$m$ showing the value of correlation with the reference characteristic data Cref read from the memory 18 for each of the different person sample data Co1-$m$ input at step SP2 shown in FIG. 2.

Step SP13: The threshold determining section 22 calculates an average value $\mu t$ of n correlation data Ft1-$n$ calculated at step SP11.

Step SP14: The threshold determining section 22 calculates an average value $\mu o$ of m correlation data Fo1-$m$ calculated at step SP12.

Step SP15: The threshold determining section 22 calculates a standard deviation $\sigma t$ of correlation data for a genuine person based on the following formula (1) based on the correlation data Ft1-$n$ calculated at step SP11 and the average value $\mu t$ calculated at step SP13.

$$\sigma t = \sqrt{\frac{1}{n}\sum_{i=1}^{n}(Fti - \mu t)^2} \quad (1)$$

Step SP16: The threshold determining means 22 calculates a standard deviation $\sigma o$ of correlation data for a different person based on the following formula (2) based on the correlation data Fo1-$m$ calculated at step SP12 and the average value $\mu o$ calculated at step SP14.

$$\sigma o = \sqrt{\frac{1}{m}\sum_{i=1}^{m}(Foi - \mu o)^2} \quad (2)$$

Step SP17: The threshold determining section 22 calculates a value X satisfying the following formula (3), based on the average value $\mu t$ calculated at step SP13 and the standard deviation $\sigma t$ calculated at step SP15.

In the following formula (3), the left side shows a Mahalanobis distance by the genuine person distribution, and the right side shows a Mahalanobis distance by the different person distribution.

If the following formula (4) is satisfied, the following formula (3) becomes the following formula (5), and can be converted into the following formulae (6) and (7).

Thus, the threshold determining section 22 calculates the value X based on the following formula (7).

$$\frac{|X - \mu t|}{\sigma t} = \frac{|X - \mu o|}{\mu o} \quad (3)$$

$$\mu t > \mu o \quad (4)$$

$$\frac{\mu t - X}{\sigma t} = \frac{X - \mu o}{\sigma o} \quad (5)$$

$$\sigma o(\mu t - X) = \sigma t(X - \sigma o) \quad (6)$$

$$X = \frac{\sigma o \varpi t + \sigma t \mu o}{\sigma t + \sigma o} \quad (7)$$

Step SP18: The threshold determining section 22 determines the valued X calculated at step SP17 to be the threshold Xth.

That is, the threshold determining section 22 assumes that the genuine person distribution specified by the correlation data Ft1-$n$ and the different person distribution specified by the correlation data Fo1-$m$ are normal distributions, and calculates the threshold Xth based on their average values $\mu t$ and $\mu o$ and standard deviations $\sigma t$ and $\sigma o$.

An example of operation of the authentication apparatus 1 shown in FIG. 1 will be described below.

The threshold determining section 22 shown in FIG. 1 generates the threshold Xth and writes it in the memory 18 as described using FIGS. 2 and 3.

During inspection, the biological data reading section 12 reads biological data of a fingerprint, vein or the like from the organism 10 such as, for example, a finger of a human, and outputs the read biological data S12 to the characteristic extracting section 14.

Then, the characteristic extracting section 14 extracts inspection characteristic data S14 showing a characteristic of, for example, a fingerprint, a branch point or end point of a vein or the like from the biological data S12 input from the biological data reading section 12, and outputs the inspection characteristic data S14 to the correlation value calculating section 16.

Then, the correlation value calculating section 16 detects correlation data Ft showing a value of correlation between the inspection characteristic data S14 input from the characteristic extracting section 14 and reference characteristic data Cref read from the memory 18, and outputs the correlation value to the authentication section 20.

Then, the authentication section 20 determines whether the correlation value shown by the correlation data Ft input from the correlation value calculating section 16 is larger than the threshold Xth or not, and authenticates that the organism 10 is authorized if determining that the correlation value is larger than the threshold Xth, and authenticates that the organism 10 is not authorized if determining that the correlation value is not larger than the threshold Xth.

As described above, according to the authentication apparatus 1, in the threshold determining section 22, the threshold Xth (X) is determined so that the Mahalanobis distance by the genuine person distribution coincides the Mahalanobis distance by the different person distribution as shown in step SP17 shown in FIG. 3 and the above formula (3).

Consequently, the false acceptance rate FAR and the false rejection rate FRR can be made to substantially coincide with each other, thus making it possible to perform balanced high-accuracy authentication.

Second Embodiment

In this embodiment, a genuine person distribution TP corresponds to the first normal distribution of the first embodiment of the present invention, a different person distribution OP corresponds to the second normal distribution of the first embodiment of the present invention, and a deformed different person distribution corresponds to the third normal distribution of the first embodiment of the present invention.

In the first embodiment described above, the threshold determining section 22 directly uses the different person distribution specified by the correlation data Fo1-$m$ to calculate the average value μo and the standard deviation σo.

In this embodiment, the different person distribution is deformed using its skewness, and the average value μo and the standard deviation σo based on are calculated based on the deformed different person distribution to reduce a ratio of FAR/FRR with stability.

Figure 4:
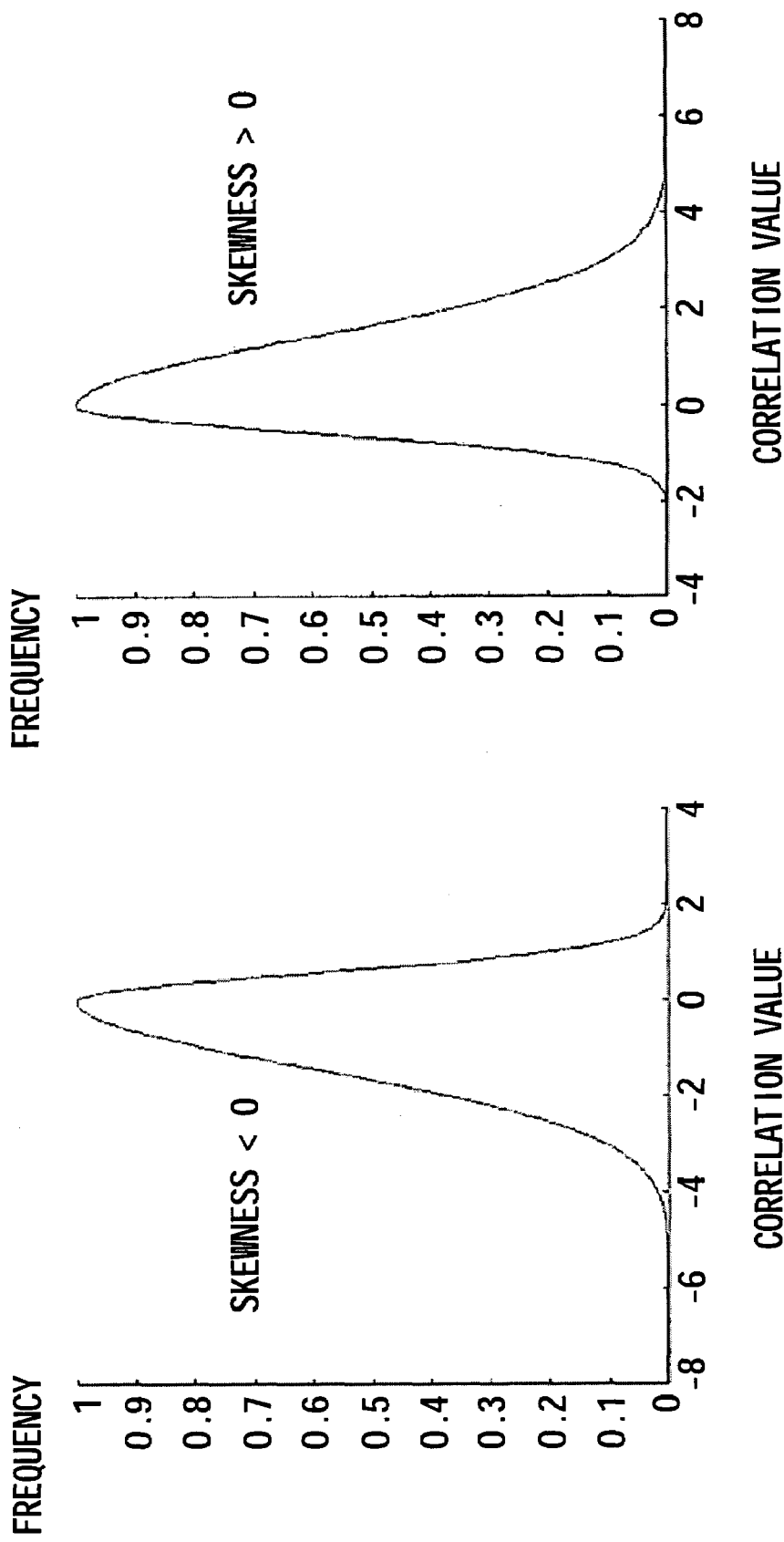
FIGS. 4A and 4B are views for explaining a characteristic of a different person distribution.

Here, the skewness is a value representing a bilateral symmetric property, and becomes 0 if the distribution is bilaterally symmetric like the normal distribution, and the distribution is biased toward the right as shown in, for example, FIG. 4A if the value is negative, and the distribution is biased toward the left as shown in, for example, FIG. 4B if the value is positive, and the distribution is spread in a direction opposite to the bias.

Here, where the average value of m correlation data Fo1-$m$ is Fave, and the unbiased variance is $v$, the skewness Sk is expressed by the following formula (8).

$$sk = \frac{\sum_{i=1}^{n} (Foi - F_{AVE})^3}{nv^{1.5}} \quad (8)$$

First, the case where the different person distribution OP is biased toward the right will be described with reference to FIG. 5.

Figure 5:
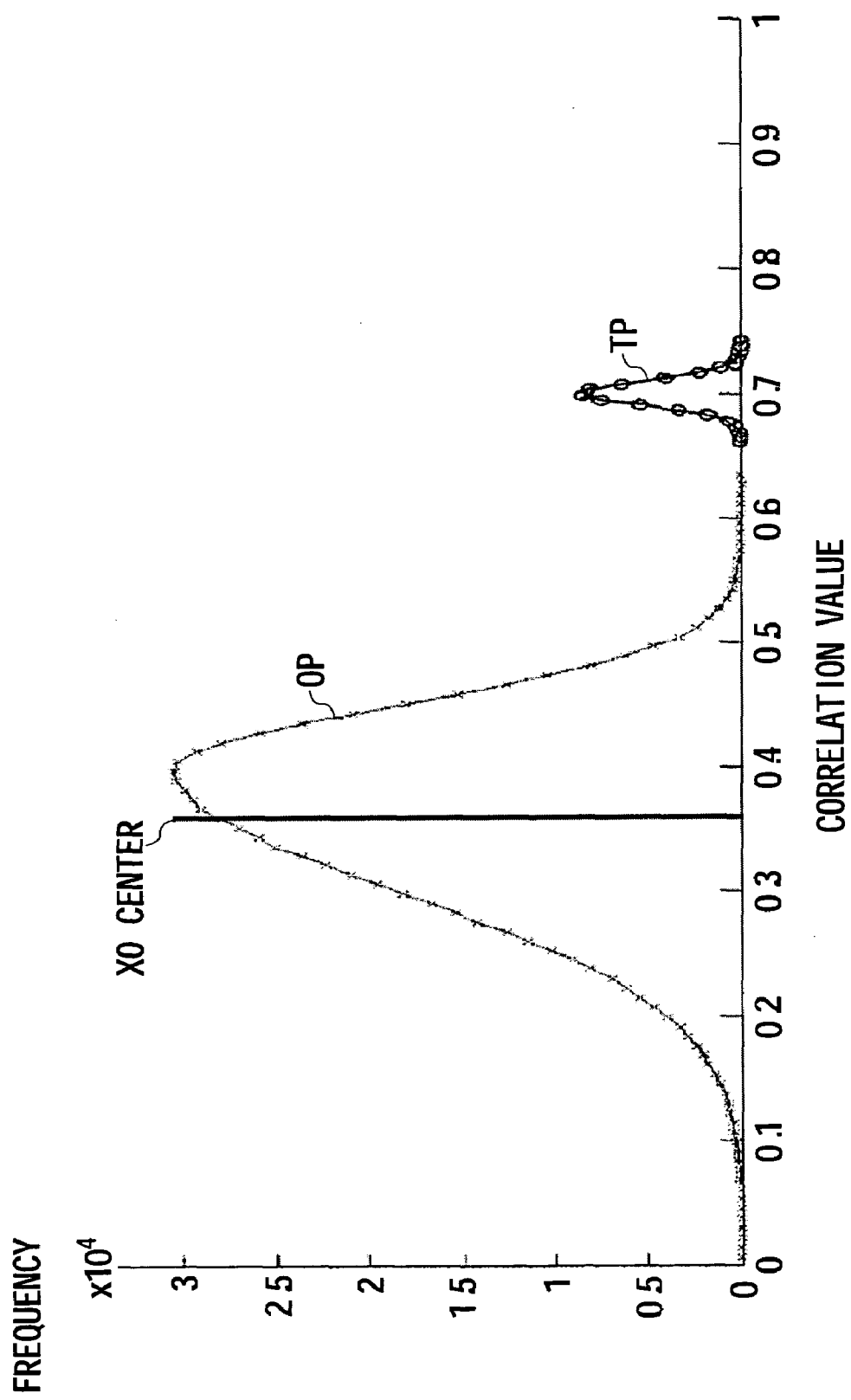
FIG. 5 is a view for explaining a characteristic of the different person distribution where the skewness is negative.

If considering where a threshold for distinguishing between the genuine person and the different person is to be set when personal authentication is performed based on the genuine person distribution TP and the different person distribution OP shown in FIG. 5, for example, the Mahalanobis distance from the center OP_C of the different person distribution OP is used, but if the different person distribution OP is biased as shown in FIG. 5, the FAR can be decreased without increasing the FRR by using the bias.

As can be seen from FIG. 5, the frequency decreases abruptly and the distribution has no spread on the right side from the distribution center of the different person distribution OP. On the left side, the frequency decreases gently and the distribution has a large spread compared with the right side. In the past, the standard deviation of the different person distribution OP was calculated using data on the left and right sides, but for checking genuineness, only data on the genuine person side, i.e. abruptly changing data is used to calculate the standard deviation again, whereby it is possible to take a form giving awareness of the different person distribution on the genuine person side. In the case of the distribution biased toward the genuine person side (right) in this way, the skewness is negative.

Figure 6:
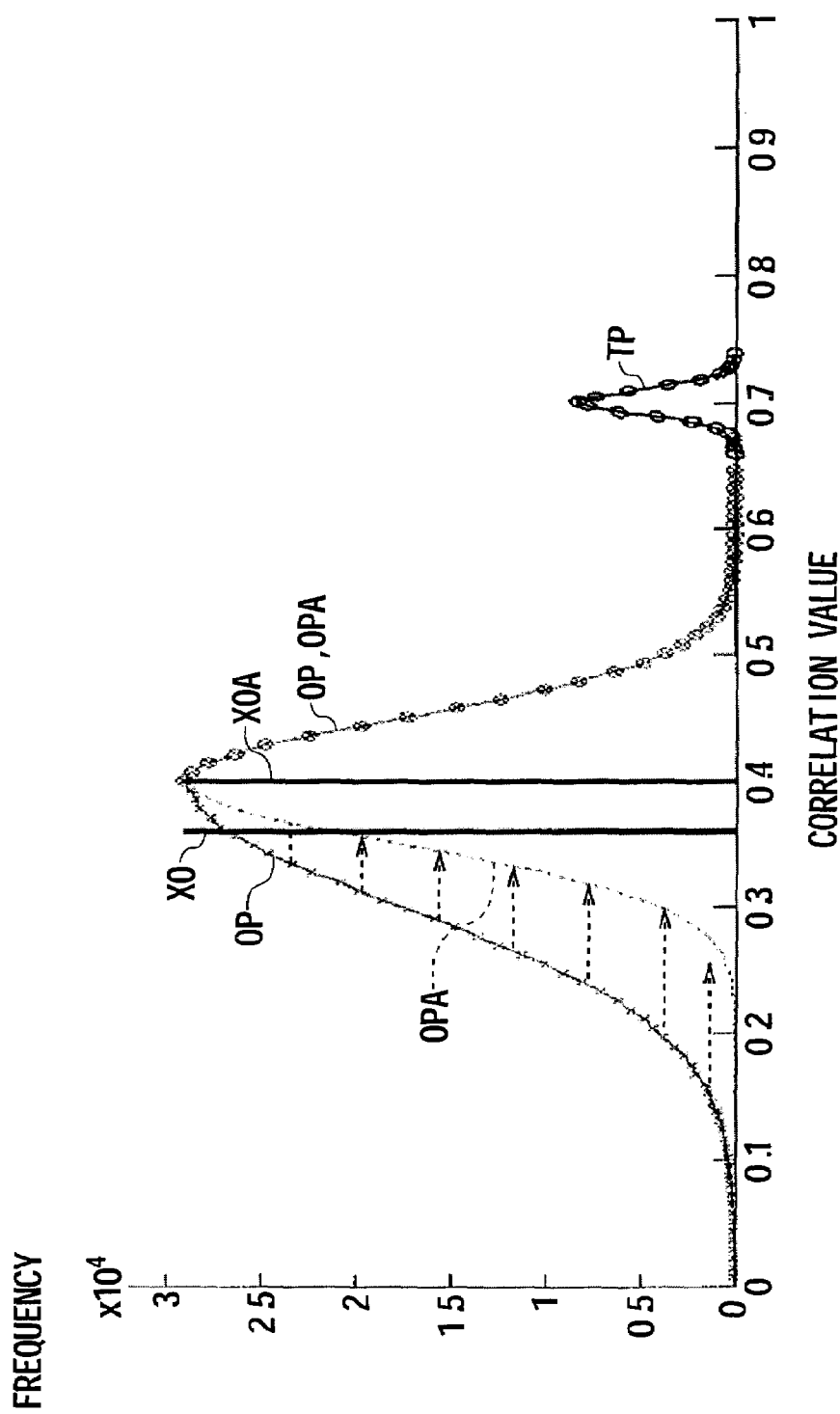
FIG. 6 is a view for explaining a characteristic of the deformed different person distribution where the skewness is negative.

First, consider the case where the skewness is negative. If only the spread on the genuine person side of the different person distribution OP is used to re-form the different person distribution considering the different person in relation to the genuine person, a different person distribution like the different person distribution OPA shown in FIG. 6 is formed. The center of the other person distribution OP on the genuine person side is positioned at a location where the frequency of the different person distribution is a maximum value.

Thus, where data constituting the different person distribution OP is xi (i=1 to m), and data constituting the different person distribution on the genuine person side is xj (j=1 to s), a variance σc2 is expressed by the following formula (9).

$$\sigma c^2 = \frac{\sum_{j=1}^{s} (xj - \bar{x}c)^2}{s} \quad (9)$$

Figure 7:
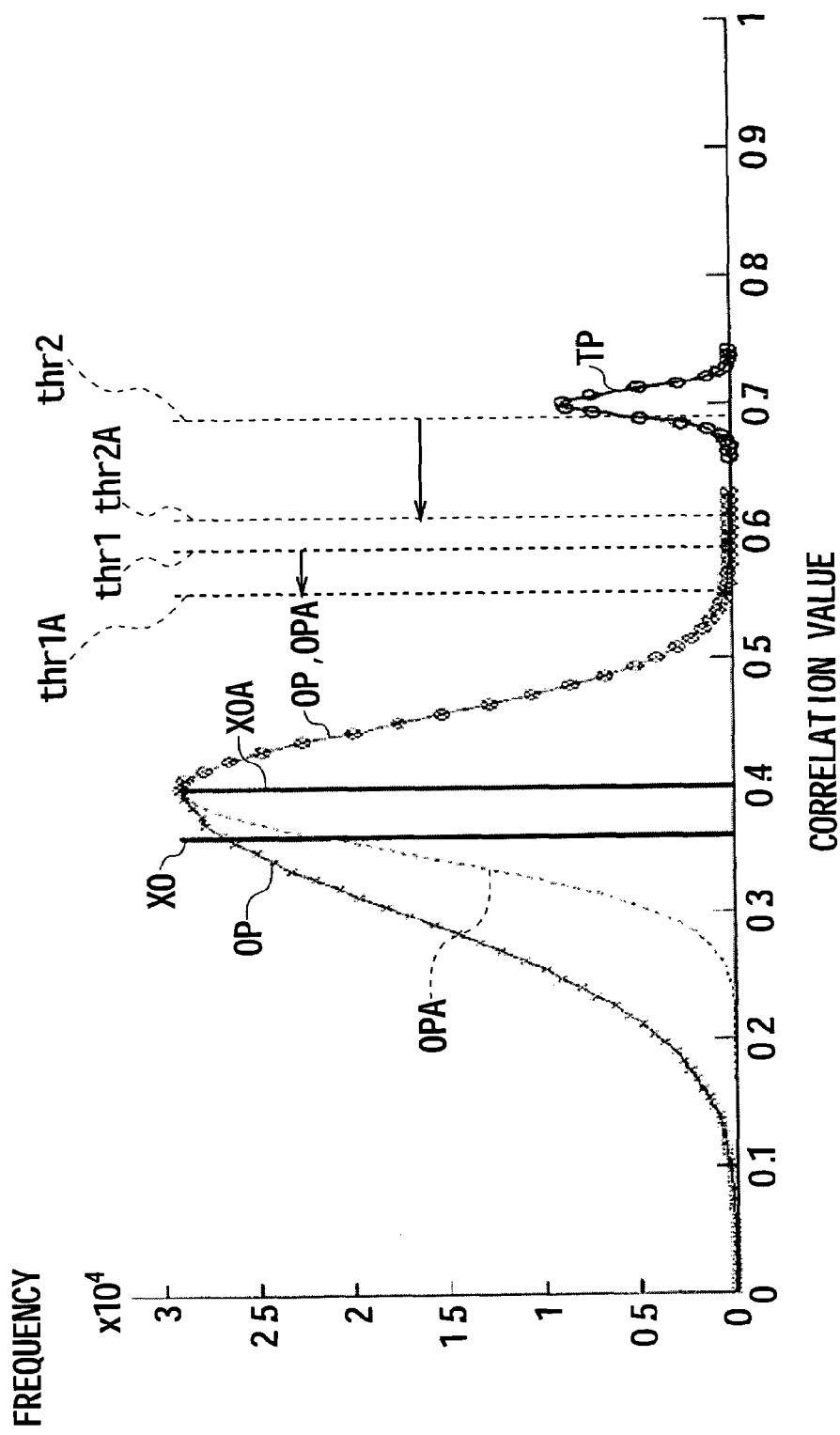
FIG. 7 is a view for explaining a threshold when using the deformed different person distribution where the skewness is negative.

The distance of the genuine person distribution from the different person distribution OP and the deformed different person distribution OPA is as shown in FIG. 7 when seen using a standard deviation as a measure.

In FIG. 7, consider a change in threshold by the Mahalanobis distance by using the above-mentioned deformed different person distribution OPA.

In FIG. 7, a threshold thr1 shows a distance 3 times as large as the standard deviation from the center of the different person distribution, and a threshold thr2 shows a distance 4.27 times as large as the standard deviation from the center of the different person distribution.

If the threshold thr2 is used, the FAR is 0.001% when converted from a normal distribution table.

If the threshold thr2 specified based on the different person distribution OP is used, the threshold thr2 is well within the genuine person distribution, and the false rejection rate FRR becomes relatively large. If a threshold thr2A is determined based on the deformed different person distribution OPA, the false rejection FRR can be sufficiently reduced with little increase in different person acceptance rate FAR.

Next, the case where the different person distribution OP is biased toward the left will be described with reference to FIG. 8.

Figure 8:
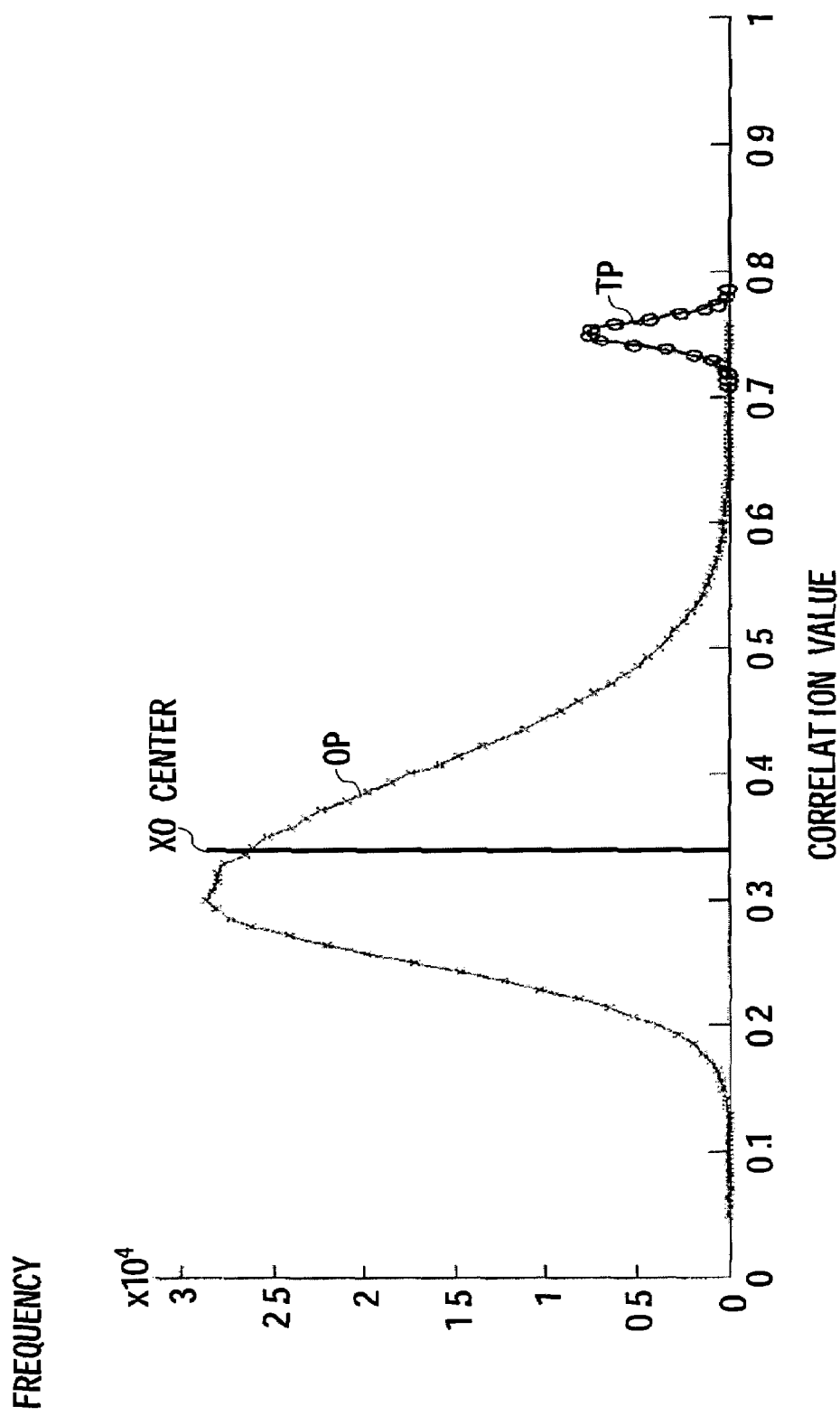
FIG. 8 is a view for explaining a characteristic of the different person distribution where the skewness is positive.
Figure 9:
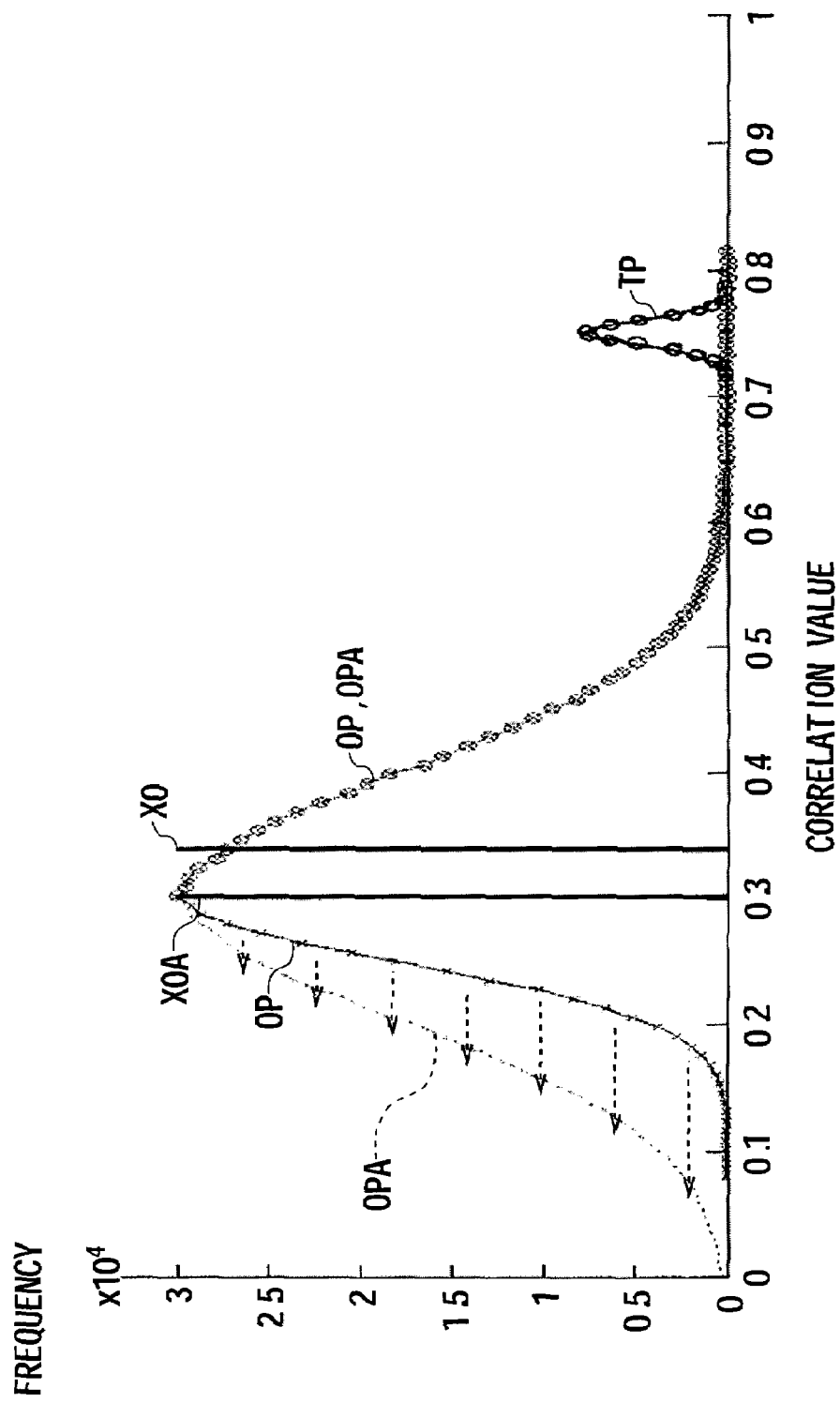
FIG. 9 is a view for explaining a characteristic of the deformed different person distribution where the skewness is positive.

For example, also in the case of FIG. 8, if only the spread on the genuine person side of the different person distribution OP is used to re-form the different person distribution considering the different person in relation to the genuine person, a different person distribution like that shown in FIG. 9 is formed. The center of the other person distribution OP on the genuine person side is positioned at a location where the frequency of the different person distribution is a maximum value.

The distance of the genuine person distribution from the different person distribution OP and the deformed different person distribution OPA is as shown in FIG. 9 when seen using a standard deviation as a measure.

In FIG. 9, consider a change in threshold by the Mahalanobis distance by using the above-mentioned deformed different person distribution.

Figure 10:
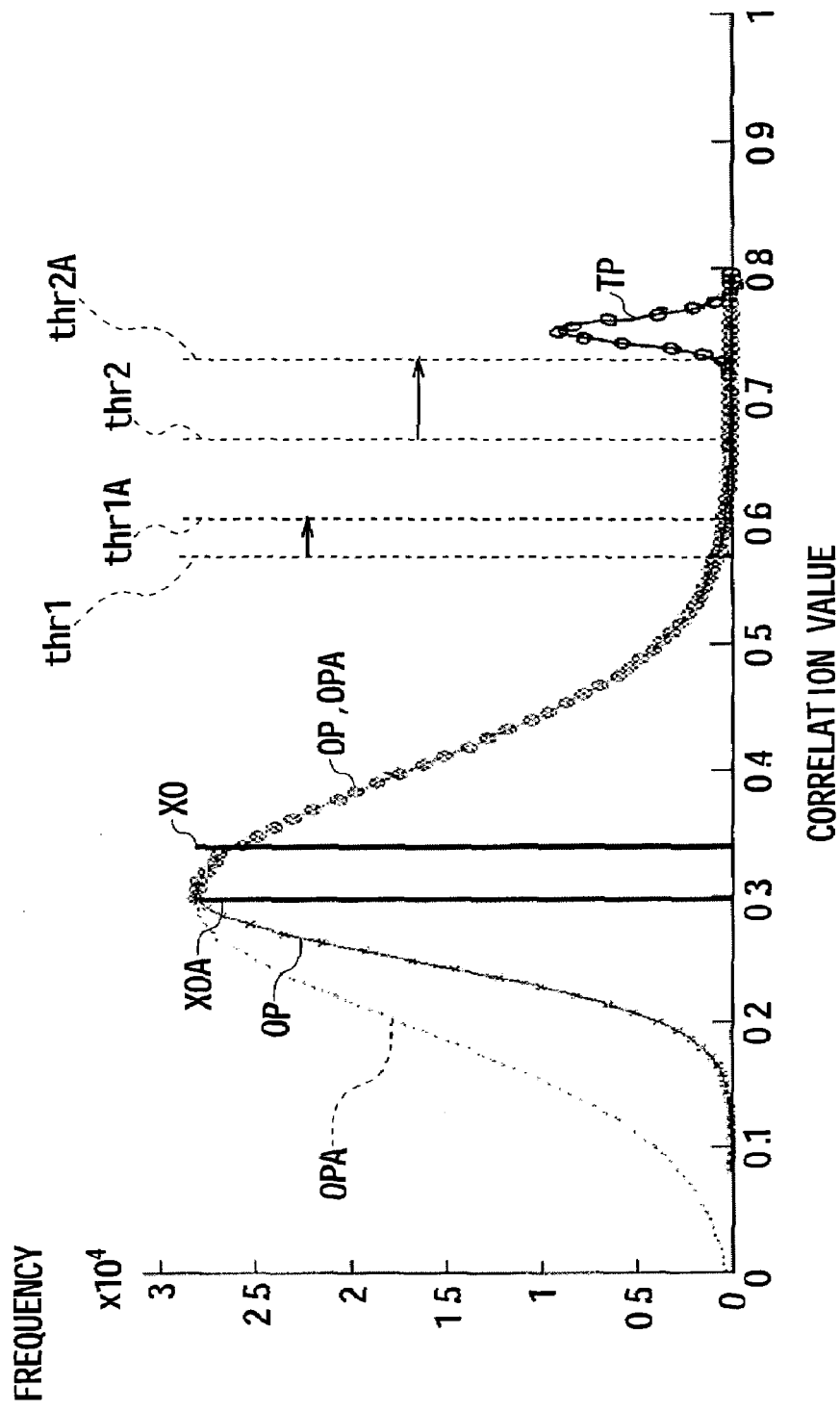
FIG. 10 is a view for explaining a threshold when using the deformed different person distribution where the skewness is positive.

In FIG. 10, the threshold thr1 shows a distance 3 times as large as the standard deviation from the center of the different person distribution, and the threshold thr2 shows a distance 4.27 times as large as the standard deviation from the center of the different person distribution.

If the threshold thr2 is used, the FAR is 0.001% when converted from a normal distribution table.

If the threshold thr2 specified based on the different person distribution OP is used, the threshold thr2 is well apart from the genuine person distribution, and the false rejection rate FRR is sufficiently small. If the threshold thr2A is determined based on the deformed different person distribution OPA, both the false acceptance rate FAR and false rejection FRR increase. Namely, if the threshold value is determined based on the entire distribution, the set FAR and FRR may not sufficiently function. According to this embodiment, a problem of setting a threshold lower than a proper threshold to actually cause trouble during authentication can be solved.

An authentication apparatus 31 of this embodiment determining the threshold Xth based on the different person distribution OPA obtained by deforming the different person distribution OP as described above will be described below.

Figure 11:
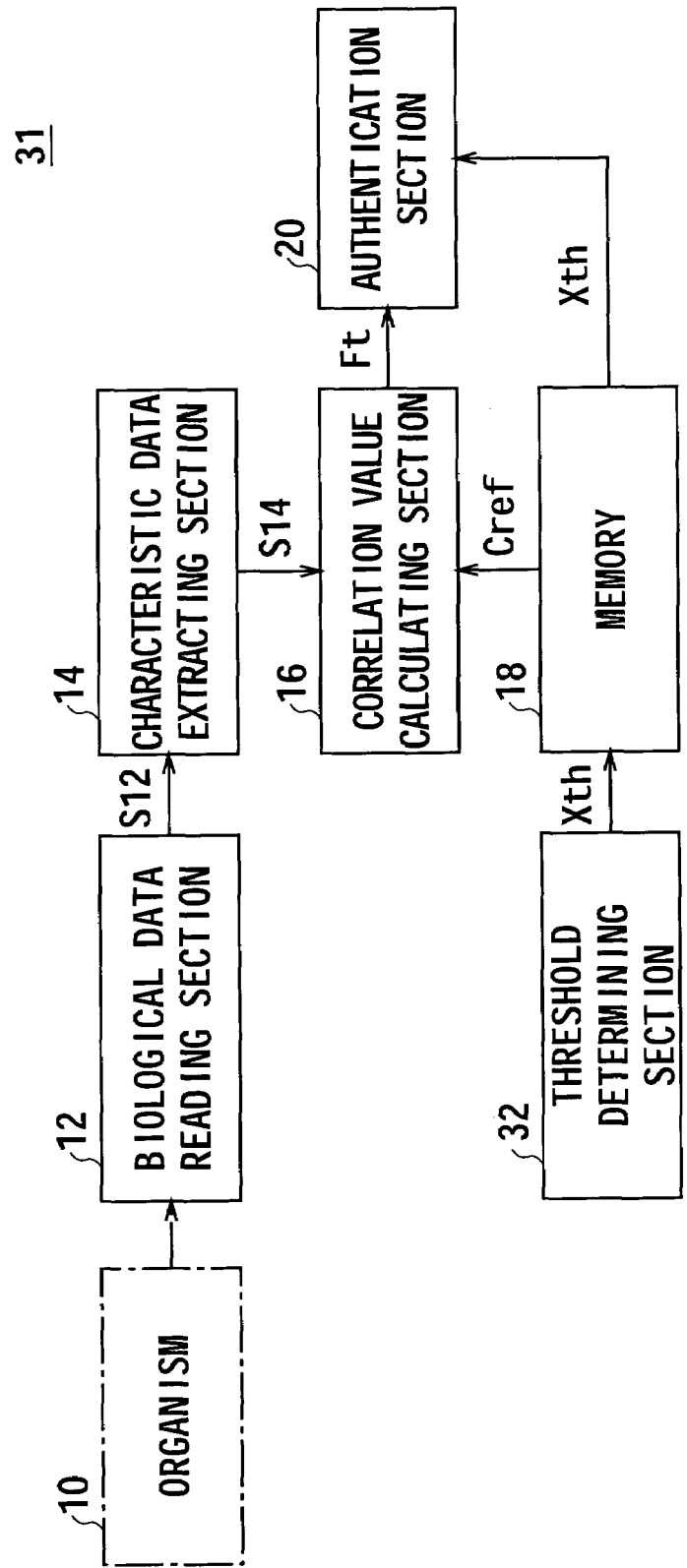
FIG. 11 is a view of a general configuration of an authentication apparatus of a second embodiment of the present invention.

FIG. 11 is a block diagram of the authentication apparatus 31 according to an embodiment of the present invention.

As shown in FIG. 11, the authentication apparatus 31 has, for example, the biological data reading section 12, the characteristic extracting means 14, the correlation value calculating unit 16, the memory 18, the authentication section 20 and a threshold determining section 32.

In FIG. 11, component given symbols same as those of FIG. 1 are same as the components described in the first embodiment.

Namely, in the authentication apparatus 31, the threshold determining section 32 is different from the threshold determining section 22 of the first embodiment.

The threshold determining section 32 is implemented by execution of a program by dedicated hardware such as an electronic circuit or a process circuit.

The threshold determining section 32 will be described in detail below.

The threshold determining section 32 calculates the threshold value Xth as described below based on genuine person sample data Ct1-$n$ being characteristic data previously acquired from the organism 10 multiple times and different person sample data Co1-$m$ being characteristic data previously acquired from an organism other than the organism 10 (different person), and writes the threshold Xth in the memory 18.

In this case, as described using FIGS. 6, 7, 9 and 10, the threshold determining section 32 generates a different person distribution OPA line-symmetric with respect to the maximum frequency in the different person distribution OP specified by different person sample data Co1-$m$, and calculates the threshold Xth using this different person distribution OPA, instead of directly using the different person sample data Co1-$m$.

Figure 12:
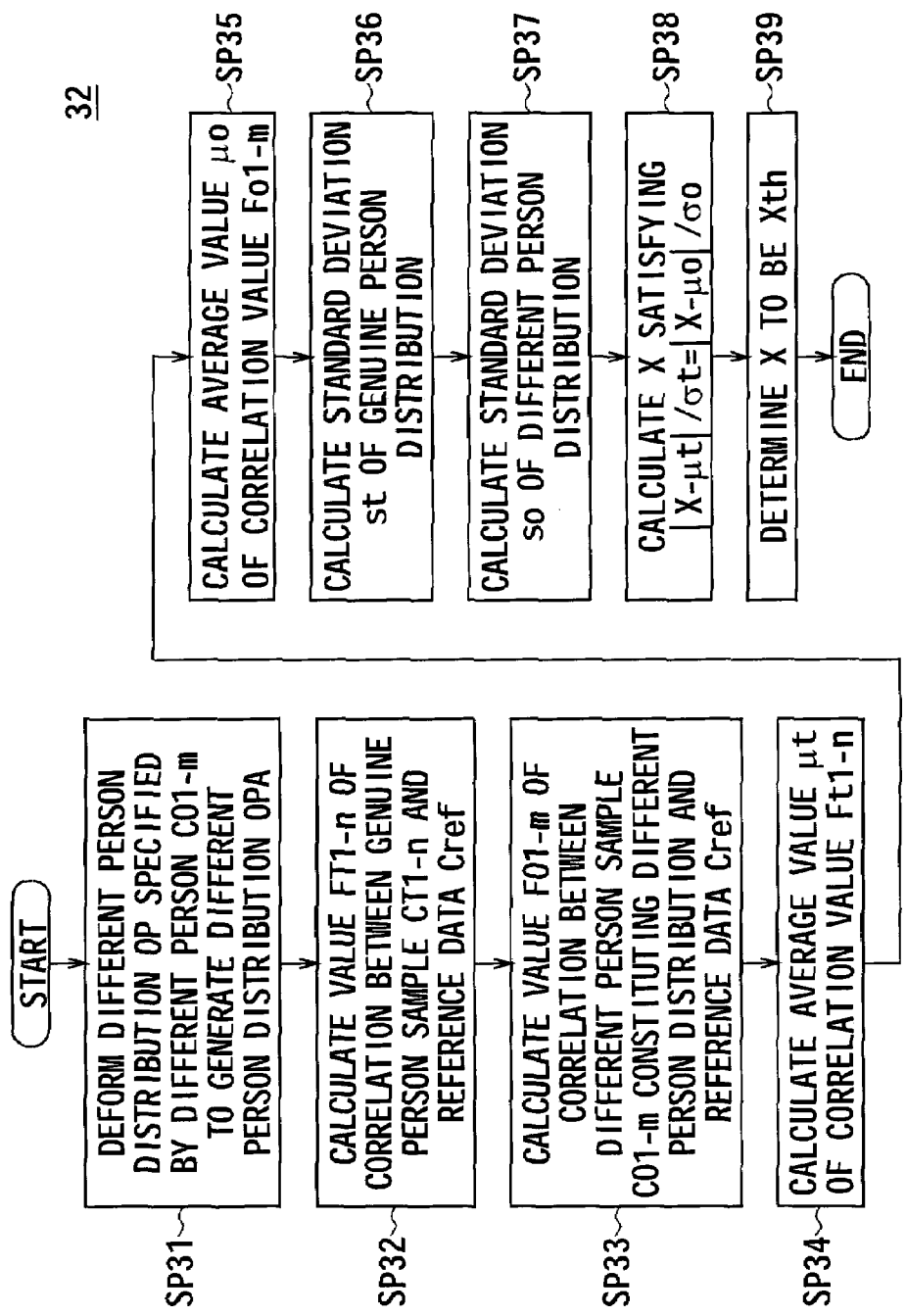
FIG. 12 is a flowchart for viewing processing at step SP3 shown in FIG. 2 in the authentication apparatus shown in FIG. 11.

FIG. 12 is a flowchart for explaining processing in the threshold determining section 32.

Step SP32 shown in FIG. 12 is identical to step SP11 shown in FIG. 3.

Steps SP34 to SP39 shown in FIG. 12 are identical to steps SP13 to SP18 shown in FIG. 3.

At step SP31, the threshold determining section 32 generates the different person distribution OPA line-symmetric with respect to the maximum frequency in the different person distribution OP specified by the different sample data Co1-$m$ input at step SP2 shown in FIG. 2 as described above.

At step SP33, the threshold determining section 32 calculates correlation data Fo1-$m$ showing the value of correlation with the reference characteristic data Cref read from the memory 18 for each of the different sample data Co1-$m$ constituting the different person distribution OPA generated at step SP31.

As described above, according to the authentication apparatus 31, the threshold determining section 32 determines the threshold Xth based on the different person distribution OPA obtained by deforming the different person distribution OP using its skewness, thus making it possible to reduce the FAR/FRR with stability.

Third Embodiment

The authentication apparatus of this embodiment will be described below using FIGS. 13 to 18.

First, correspondence between the components of this embodiment and the components of the present invention will be described.

This embodiment corresponds to the third to sixth embodiments of the present invention.

An input section 43 corresponds to the input means of the third to fifth embodiments of the present invention, the authentication section 20 corresponds to the authentication means of the third and fifth embodiments of the present invention, and a threshold determining section 42 corresponds to the threshold determining means of the third and fifth embodiments of the present invention.

The memory 18 corresponds to the storage means of the third and fifth embodiments of the present invention.

The false acceptance rate FAR corresponds to the different organism acceptance rate of the present invention, and the false rejection rate FRR corresponds to the genuine organism rejection rate.

Figure 13:
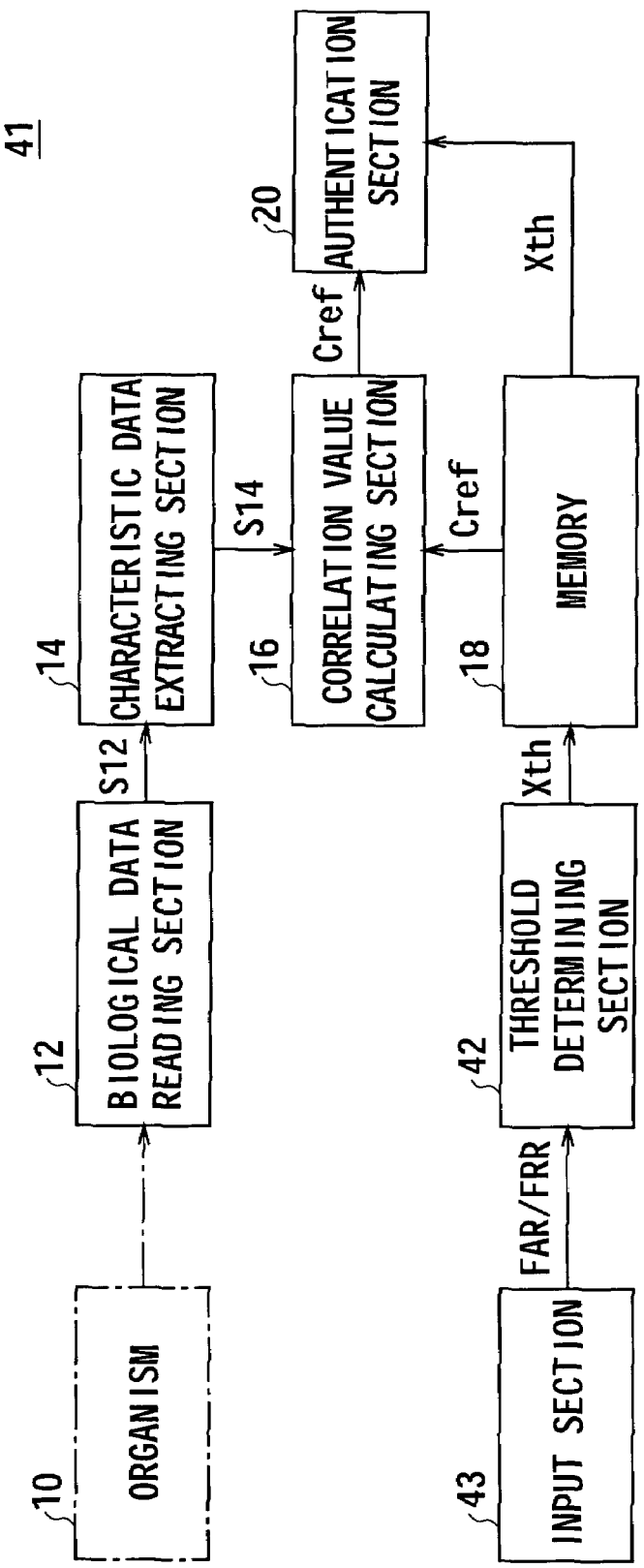
FIG. 13 is a view of a general configuration of an authentication apparatus of a third embodiment of the present invention.

FIG. 13 is a block diagram of an authentication apparatus 41 according to the embodiment of the present invention.

As shown in FIG. 13, the authentication apparatus 41 has, for example, the biological data reading section 12, the characteristic extracting section 14, the correlation value calculating section 16, the memory 18, the authentication section 20, the input section 43 and the threshold determining section 42.

In FIG. 13, the components given symbols same as those of FIG. 1 are identical to the components described in the first embodiment.

That is, the authentication apparatus 41 has the input section 43, and the threshold determining section 42 is different from the threshold determining section 22 of the first embodiment.

The threshold determining section 42 is implemented by execution of a program by dedicated hardware such as an electronic circuit or a process circuit.

The input section 43 is input means such as a keyboard and a mouse, and inputs the false acceptance rate FAR or false rejection rate FRR according to total operation by the user.

The threshold determining section 42 determines the threshold value Xth so as to meet the false acceptance rate FAR or false rejection rate FRR input by the input section 43 with the assumption that the genuine person distribution TP and the different person distribution OP conforms to the normal distribution.

First, the relation between the genuine person distribution TP and different person distribution OP and the false acceptance rate FAR and false rejection rate FRR will be described with reference to FIG. 14.

Figure 14:
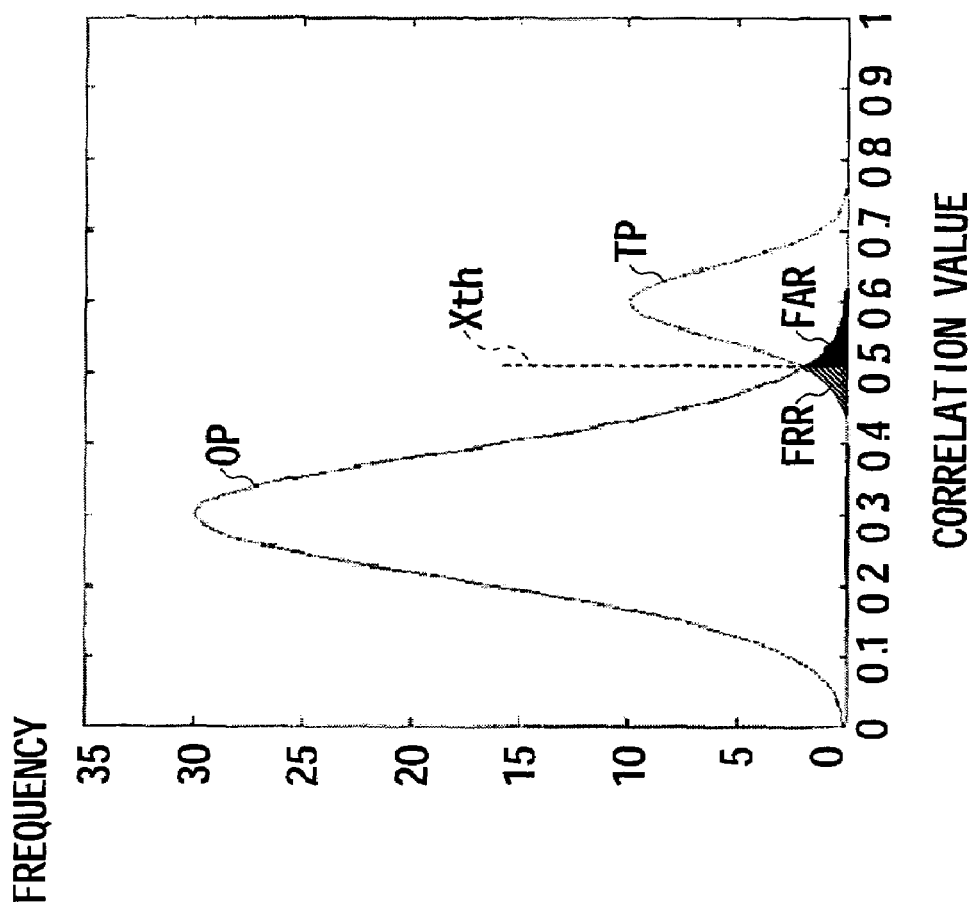
FIG. 14 is a view for explaining a relation between the different person distribution and genuine person distribution and the FRR and FAR.

In FIG. 14, the false acceptance rate FAR shows a ratio to the entire different person distribution OP of a value obtained by integrating the different person distribution OP from the threshold Xth to 1, i.e. a ratio of the area of the different person distribution OP on the right side from the threshold thereof in the figure.

The false rejection rate FRR shows a ratio to the entire genuine person distribution TP of a value obtained by integrating the genuine person distribution TP from 0 to the threshold value Xth, i.e., a ratio of the area of the genuine person distribution TP on the left side from the threshold value Xth thereof in the figure.

$$FAR = \frac{\int_{Xth}^{1} OP(x)dx}{\int_{0}^{1} OP(x)dx}, FRR = \frac{\int_{0}^{Xth} TP(x)dx}{\int_{0}^{1} TP(x)dx} \quad (10)$$

When the input section 43 inputs the false rejection rate (%), the threshold determining section 42 specifies a value close to a value corresponding to the false rejection rate FRR "FRR/100" from the normal distribution table data TABLE shown in FIG. 15, and determines the specified value to be a Mahalanobis distance dt. The normal distribution table data TABLE is stored in, for example, the memory 18 shown in FIG. 13.

At this time, the threshold Xth is expressed by the following formula (11).

$$Xth = \mu t - \sigma t dt \quad (11)$$

When the threshold Xth of the above formula (11) is considered in relation to the different person distribution OP, a Mahalanobis distance do being a distance from the center of the different person distribution OP is expressed by the following formula (12).

$$do = \frac{Xth - \mu o}{\sigma o} \quad (12)$$

The threshold determining section 42 specifies the false acceptance rate FAR being a value corresponding to the Mahalanobis distance do from the normal distribution table data TABLE shown in FIG. 15.

When the input section 43 inputs the false acceptance rate FAR (%), the threshold determining section 42 specifies a value close to a value corresponding to the false acceptance rate FAR "FAR/100" from the normal distribution table data TABLE shown in FIG. 15, and determines the specified value to be a Mahalanobis distance do.

At this time, the threshold Xth is expressed by the following formula (13).

$$Xth = \mu o + \sigma o do \quad (13)$$

When the threshold Xth of the above formula (13) is considered in relation to the genuine person distribution TP, the Mahalanobis distance dt being a distance from the center of the genuine person distribution TP is expressed by the following formula (14).

$$dt = \frac{\mu t - Xth}{\sigma t} \quad (14)$$

The threshold determining section 42 specifies the false rejection rate FRR being a value corresponding to the Mahalanobis distance dt from the normal distribution table data TABLE shown in FIG. 15.

In the example described above, the case of use of the normal distribution table data TABLE stored in the memory 18 is illustrated, but approximation calculation of the normal distribution may be performed based on the input false acceptance rate FAR or false rejection rate FRR to calculate the Mahalanobis distance.

For the approximate calculation, the approximate formula of Hastings, et al, the Maclaurin's expansion formula, the shenton's continued fraction expansion formula, the asymptotic expansion formula, Laplace's continued fraction expansion formula, the Williams's approximate formula, Yamauchi's approximate formula, Gauss-Legendre's numerical integration and the like are used.

An example of operation of the threshold determining section 42 will be described below.

Figure 16:
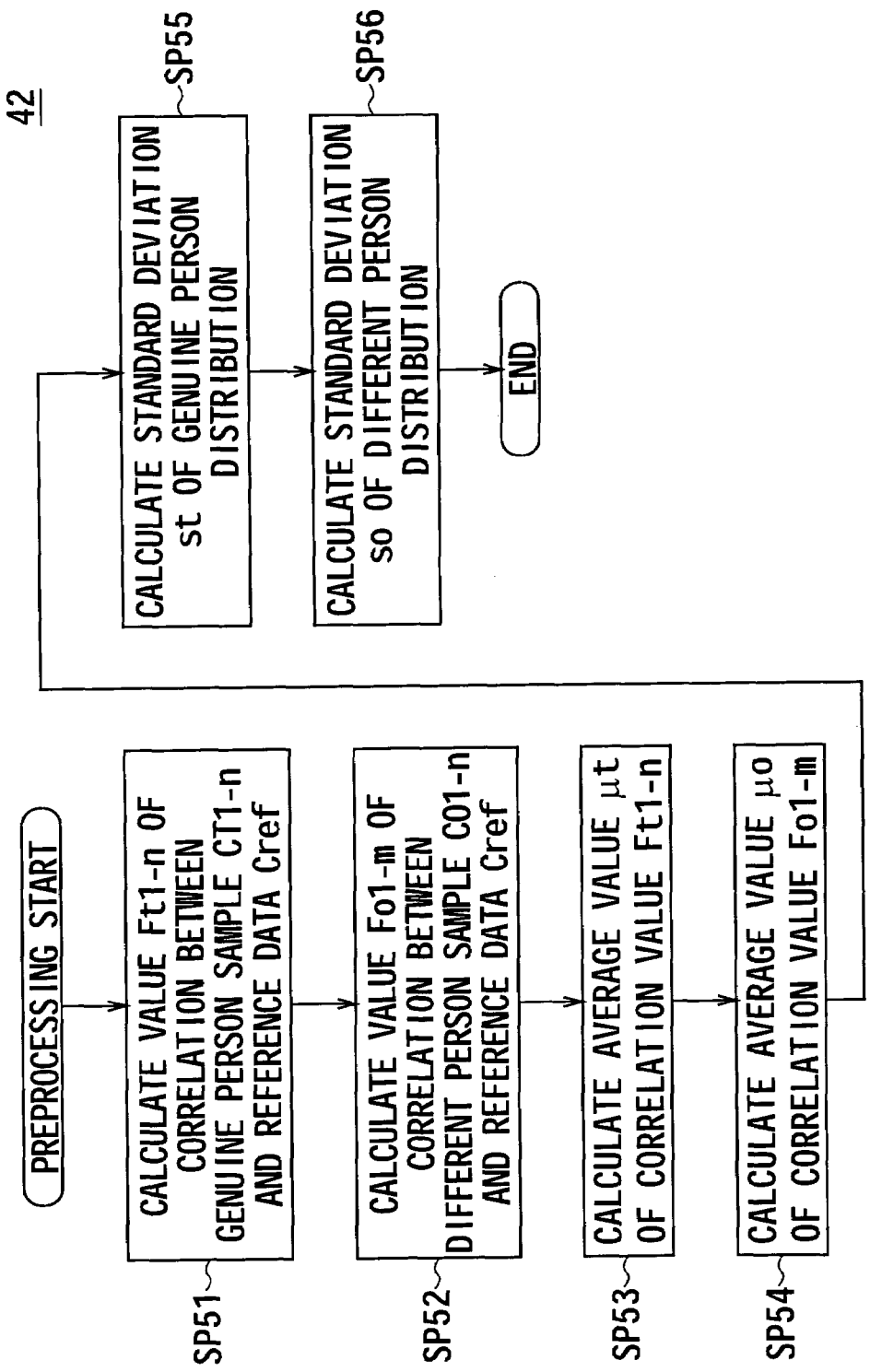
FIG. 16 is a flowchart for explaining preprocessing in a threshold determining section of the authentication apparatus shown in FIG. 15.

FIG. 16 is a flowchart for explaining preprocessing in the threshold determining section 42 shown in FIG. 13.

The threshold determining section 42 carries out preprocessing shown in FIG. 16 before the false acceptance rate FAR or false rejection rate FRR is input.

Steps SP51 to SP56 shown in FIG. 16 are identical to steps SP11 to SP16 described in the first embodiment using FIG. 3.

Figure 17:
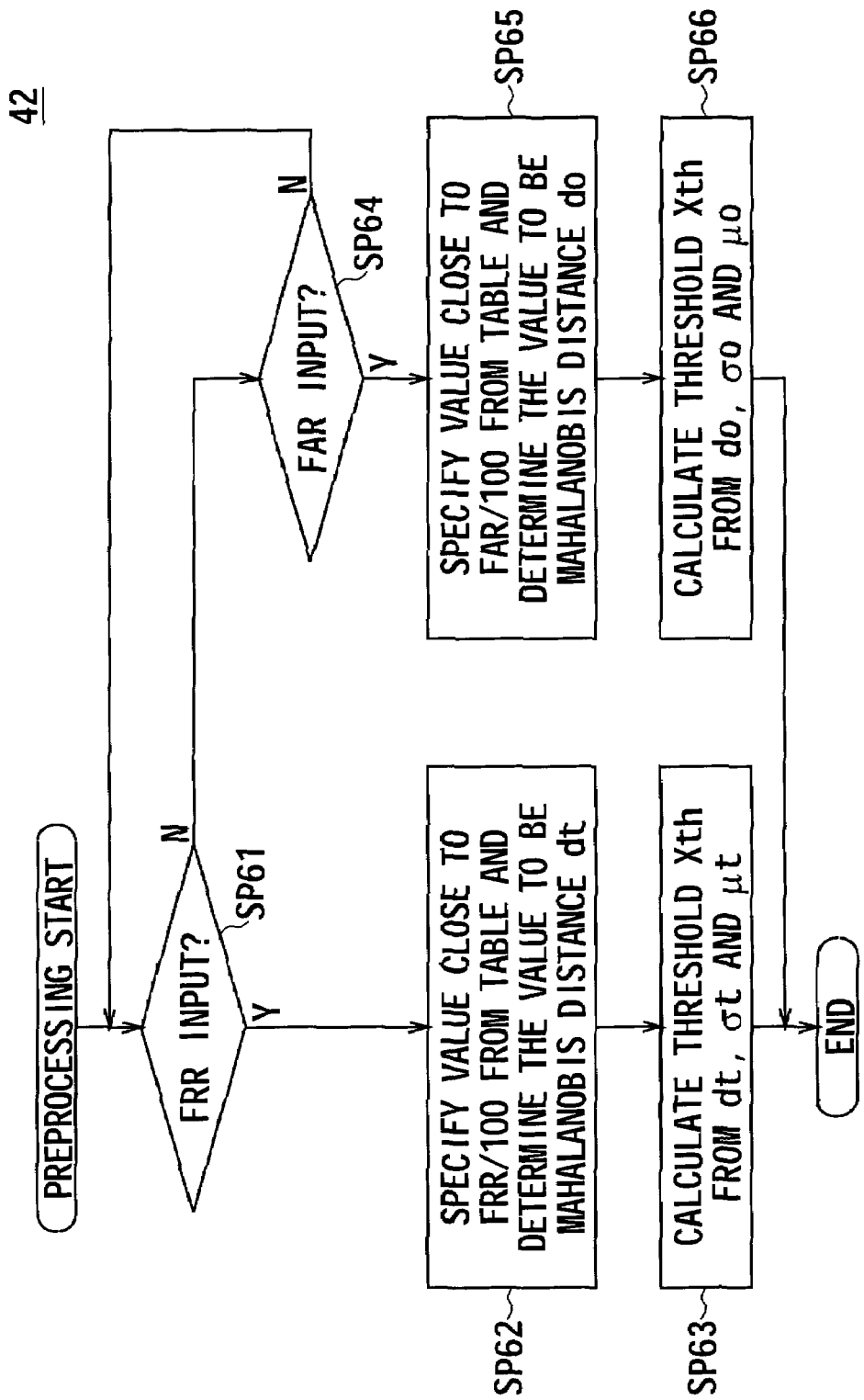
FIG. 17 is a flowchart for explaining processing in the threshold determining section of the authentication apparatus shown in FIG. 15.

FIG. 17 is a flowchart for explaining processing in the threshold determining section 42 when the false acceptance rate FAR or false rejection rate FRR is input.

Step SP61: The threshold determining section 42 determines whether the input section 43 has input the false rejection rate FRR or not, and processing proceeds to step SP62 if it is determined that the input section 43 has input the false rejection rate FRR, and processing proceeds to step SP64 otherwise.

Step SP62: The threshold determining section 42 specifies a value close to "FRR/100" based on the input false rejection rate FRR from the normal distribution table data TABLE stored in the memory 18, and determines the specified value to be the Mahalanobis distance dt.

Step SP63: The threshold determining section 42 performs calculation according to the above formula (11) using the Mahalanobis distance dt acquired at step SP62, the standard deviation σt calculated at step SP55 shown in FIG. 16, and the average value μt calculated at step SP53 to calculate the threshold Xth.

The threshold determining section 42 calculates the false acceptance rate FAR using the threshold Xth as described previously, and changes the FRR and newly calculates the threshold Xth if the calculated false acceptance rate does not meet a predetermined condition.

Step SP64: The threshold determining section 42 determines whether the input section 43 has input the false acceptance rate FAR or not, and processing proceeds to step SP65 if it is determined that the input section 43 has input the false rejection rate FRR, and processing returns to step SP61 otherwise.

Step SP65: The threshold determining section 42 specifies a value close to "FAR/100" based on the input false acceptance rate FAR from the normal distribution table data TABLE stored in the memory 18, and determines the specified value to be the Mahalanobis distance do.

Step SP66: The threshold determining section 42 performs calculation according to the above formula (13) using the Mahalanobis distance do acquired at step SP65, the standard deviation σo calculated at step SP56 shown in FIG. 16, and the average value μo calculated at step SP54 to calculate the threshold Xth.

The threshold determining section 42 calculates the false acceptance rate FRR using the threshold Xth as described previously, and changes the FAR and newly calculates the threshold Xth if the calculated false acceptance rate does not meet a predetermined condition.

As described above, according to the authentication apparatus 41, the threshold Xth can be set so that the false acceptance rate FAR and false rejection rate FRR input via the input section 43 can be realized.

Therefore, authentication suitable for a service using authentication of the authentication apparatus 41 can be performed. That is, there are cases where the false acceptance rate FAR may be high but it is desired to reduce the false rejection rate FAR, or the false rejection rate FRR may be high but it is desired to reduce the false acceptance rate FAR, depending on the specifics of the service, but authentication suitable therefor can be performed.

An example of an experiment with the authentication apparatus 41 will be described below.

Figure 18:
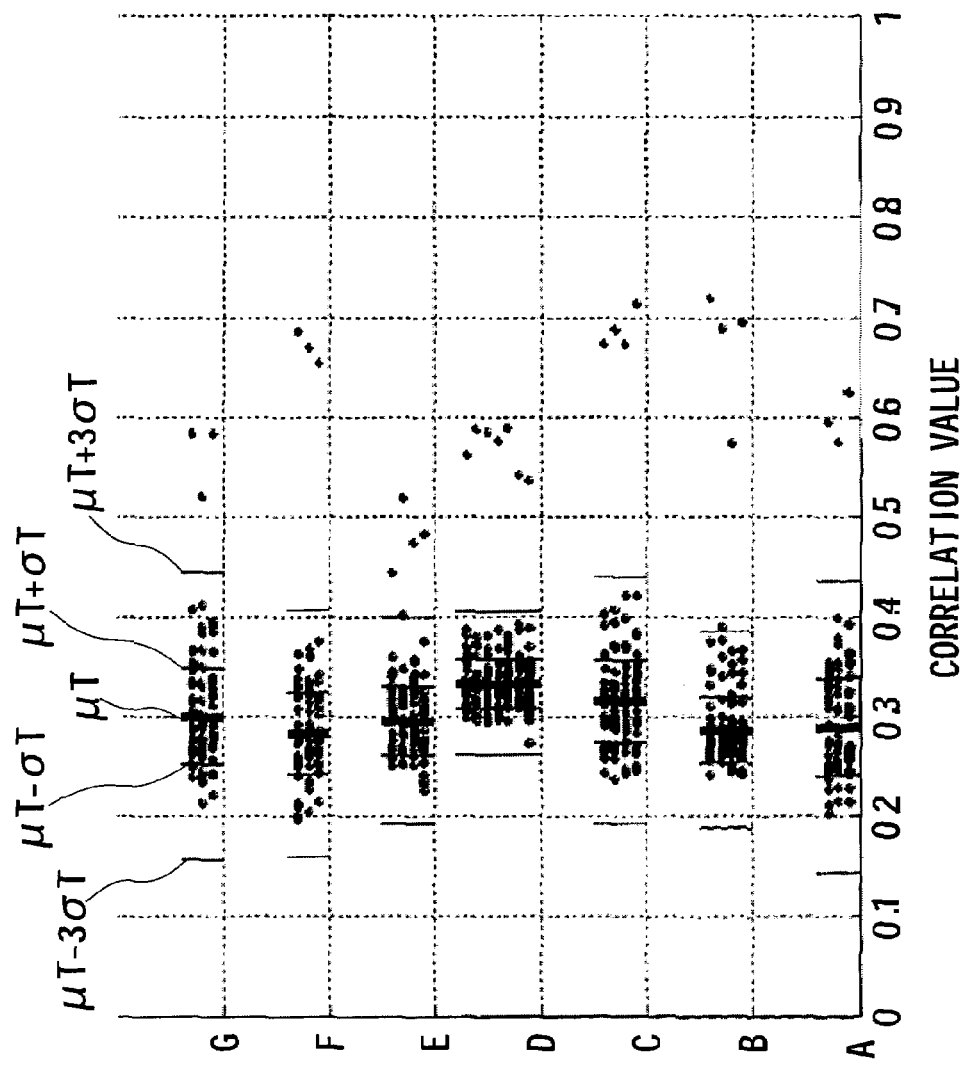
FIG. 18 is a view for explaining an example of an experiment of the authentication apparatus shown in FIG. 15.

An image with only a finger vein highlighted from a finger vein image is specified as a characteristic amount of the genuine person, and an identification of the genuine person/different person is made with a value of correlation between images being characteristic amounts. In FIG. 18, several genuine person data are taken from each of 7 subjects (A to G), and there are genuine person reference data in an amount equal to the number of genuine person data for each subject. Concentrated points on the left side represent correlation with different person data, and scattered points on the right side represent correlation with genuine person data. Bars on different person data represent an average of values of correlation with different person data for the middle bar, and distances of σ and 3σ from the average value for the next and further next bars, respectively.

In the example shown in FIG. 18, the genuine person and the different person can be reliably separated for any subjects. That is, it is likely that they can be separated if the threshold is set to a value around 0.43. This value is determined in view of the minimum value of values of correlation of the subject E with the genuine person, but if the threshold is further decreased, it becomes the maximum value of values of correlation of the subject C with the different person. That is, if the threshold is decreased for avoiding false rejection of the subject E, false acceptance of the subject C is permitted. In this way, it can be said that even a characteristic amount extracted with the same measure causes variations depending on the subject, thus making it difficult to uniquely determine the threshold. In the case of the subject C, the maximum value of values of correlation with the different person is high, but the minimum value of values of correlation with the genuine person is high. That is, as far as the subject C is concerned, an identification of the genuine person/different person can be made satisfactorily even if the threshold is larger than 0.43 described above. As far as the subject D is concerned, the average value is relatively high, but the variance is small, and therefore the threshold can be reduced.

The present invention is not limited to the above-mentioned embodiment.

In the above-mentioned embodiment, the case of determining the threshold Xth in the threshold determining sections 22, 32 and 42 in the authentication apparatuses 1, 31 and 41 is illustrated, but the threshold determining sections 22, 32 and 42 may be incorporated in an apparatus other than the authentication apparatuses 1, 31 and 41, such as a server apparatus with which the authentication apparatuses 1, 31 and 41 communicate, and from such an apparatus, the authentication apparatuses 1, 31 and 41 may input the threshold Xth.

Fourth Embodiment

This embodiment will be described below with reference to FIGS. 19 to 24.

(1) General Configuration of Authentication Apparatus

Figure 19:
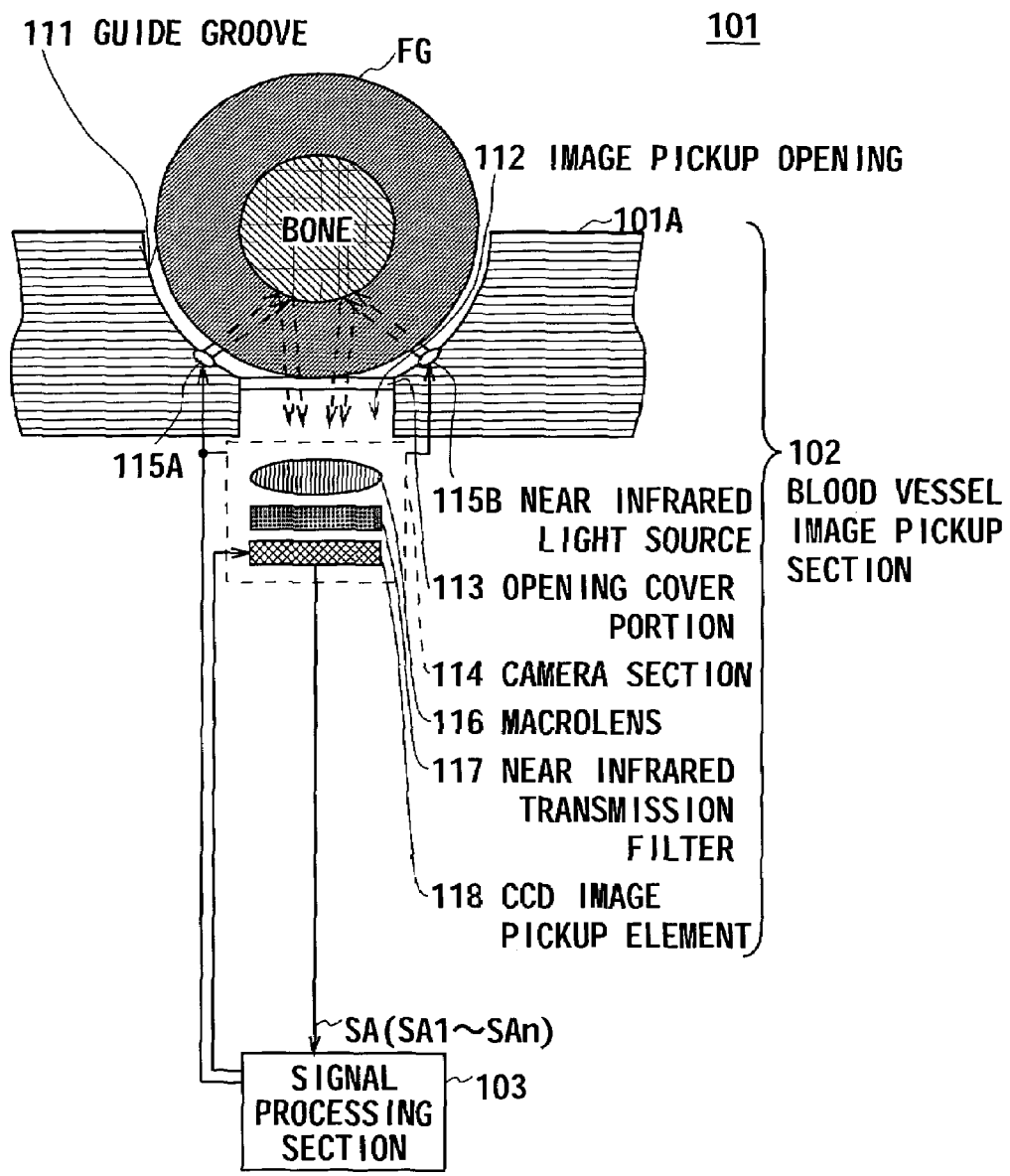
FIG. 19 is a schematic line diagram showing a general configuration of the authentication according to the embodiment of the present invention.

In FIG. 19, reference numeral 101 denotes generally the authentication apparatus according to this embodiment, which is formed by interconnecting a blood vessel image pickup section 102 and a signal processing section 103 via a cable.

This blood vessel image pickup section 102 has a curved guide groove 111 formed so as to pattern a finger FG at a predetermined position in a housing 101A of the authentication apparatus 101, and an image pickup opening 112 is placed on the bottom face of the guide groove 111.

In this way, the blood vessel image pickup section 102 can guide onto the image pickup opening 112 the ventral of the finger FG touched to the guide groove 111 in such a manner as to be fit to the guide groove 111 and position the image pickup opening 112 with respect to the finger FG touched to the guide groove 111 with the finger tip abutted against the leading end of the guide groove 111 depending on an image pickup subject.

A transparent colorless opening cover portion 113 made of a predetermined material is provided on the surface of the image pickup opening 112, while a camera section 114 is placed directly below the image pickup opening 112 in the housing 101A.

On the side face of the guide groove 111, a pair of near infrared light sources 115 (115A and 115B) applying near infrared light peculiarly absorbed to hemoglobin as image pickup light is so disposed as to hold the image pickup opening 112 therebetween parallel to the shorter direction of the guide groove 111, and can apply near infrared light to the ventral part of the finger FG touched to the guide groove 111.

Thus, in this blood image pickup section 102, the ratio of near infrared light reflecting at the surface of the finger FG is reduced compared to application of near infrared light to the ventral bottom of the finger FG. Near infrared light incident via the surface of the finger FG to the interior thereof is absorbed to hemoglobin passing through blood vessels and scattered at tissues other than blood to pass through the interior of the finger FG, and is incident to the camera section 114 via the image pickup opening 112 and the opening cover portion 113 one after another as near infrared light projecting blood vessels from the finger FG (hereinafter referred to as blood vessel projecting light).

In the camera section 114, a microlens 116, a near infrared light transmission filter 117 through which only near infrared light in a wavelength range (about 900 nm to 1000 nm) having a dependency on both oxygenation and deoxygenation hemoglobin is allowed to pass, and a CCD image pickup element 18 are placed one after another, and blood vessel projecting light incident from the opening cover portion 113 is guided to the image pickup surface of the CCD image pickup element 18 via the microlens 116 and the near infrared light transmission filter 117 one after another. In this way, the camera section 114 can faithfully form images of closely adjacent capillary vessels of both vein and artery systems coexisting in the interior of the finger FG.

The CCD image pickup element 118 picks up images of blood vessels imaged on the image pickup surface and outputs the results of the image pickup to the signal processing section 103 as image signals (hereinafter referred to as blood vessel image signals) SA1, SA2, . . . , SAn one after another under control by the signal processing section 103.

Figure 20:
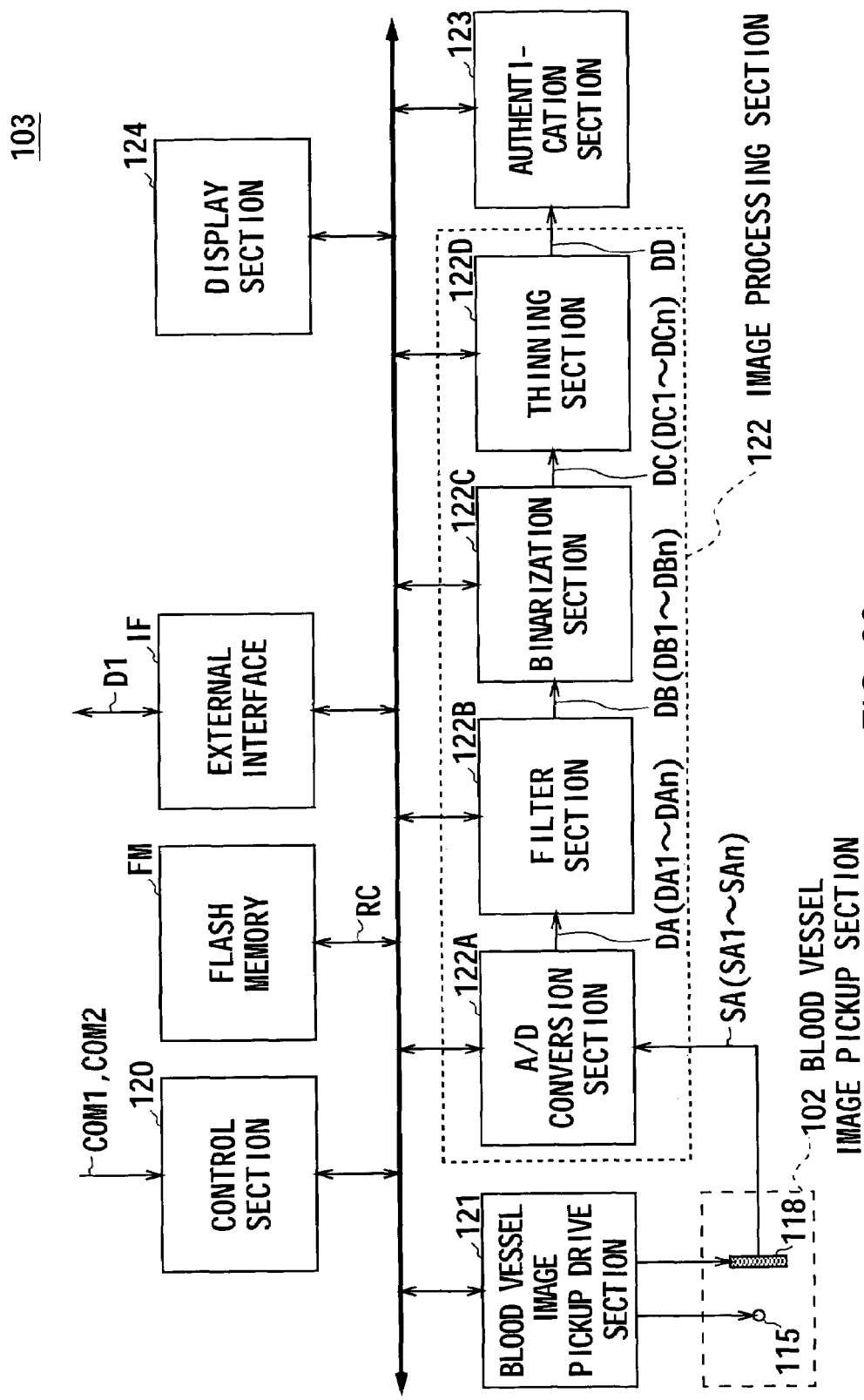
FIG. 20 is a block diagram showing a configuration of a signal processing section.

As shown in FIG. 20, the signal processing section 103 is formed by connecting a blood vessel image pickup drive section 121, an image processing section 122, an authentication section 123, a display section 124, a flash memory FM, and an interface (hereinafter referred to as external interface) IF exchanging data with the outside to a control section 120.

The control section 120 has a computer configuration including a CPU (Central processing Unit) responsible for control of the overall authentication apparatus 101, a ROM (Read Only Memory) storing various kinds of programs, and a RAM (Random Access Memory) as a work memory of the CPU, and the control section 120 is given a command COM 1 of execution of a mode of registering blood vessels of a registrant (hereinafter referred to as blood vessel registration mode) or a command COM2 of execution of a mode of determining existence or nonexistence of a genuine registrant (hereinafter referred to as authentication mode) depending on the operation of an operation section (not shown) provided at a predetermined location on the surface of the housing 101A of the authentication apparatus 101.

If the control section 120 is given the command COM 1 of execution of the blood vessel registration mode from the operation section (not shown), it changes the operation mode to the blood vessel registration mode to control the blood vessel image pickup drive section 121, the image processing section 122 and the authentication section 123 based on a corresponding program stored in the ROM, and displays the specifics of the control on the display section 124 as appropriate.

In this case, the blood vessel image pickup drive section 121 activates the blood vessel image pickup section 102 such that the near infrared light source 115 and the CCD image pickup element 118 of the camera section 114 are each driven. As a result, in the blood vessel image pickup section 102, near infrared light is applied from the near infrared light source 115 to the ventral part of the finger FG (FIG. 19) of the image pickup subject touched to the guide groove 111 (FIG. 19) at this time, and blood vessel projecting light guided to the image pickup surface of the CCD image pickup element 118 via the finger FG (FIG. 19) is sequentially output from the CCD image pickup element 118 to an A/D (analog/digital) conversion section 122A of the image processing section 122 as blood vessel image signals SA1, SA2, . . . , SAn.

The A/D conversion section 122A subjects the blood vessel image signals SA1, SA2, . . . , SAn to A/D conversion processing, and sends resultant data of blood vessel images (hereinafter referred to as blood vessel image data) DA1, DA2, . . . , DAn to a filter section 122B.

The filter section 122B subjects the blood vessel image data DA1, DA2, . . . , DAn to various kinds of filtering processing corresponding to removal of noise components, edge highlighting, and the like, and sends resultant blood vessel image data DB1, DB2, . . . , DBn to a binarization section 122C.

The binarization section 122C subjects the blood vessel image data DB1, DB2, . . . , DBn to binarization processing, and sends resultant data (hereinafter referred to as binary blood vessel image data) of black-and-white blood vessel images (hereinafter referred to as binary blood vessel images) DC1, DC2, . . . , DCn to a thinning section 122D.

The thinning section 122D subjects the binary blood vessel image data DC1, DC2, . . . , DCn to, for example, morphology processing to thin blood vessels in binary blood vessel images based on the binary blood vessel image data DC (DC1 to DCn).

The thinning section 122D selects one binary blood vessel image from a plurality of binary blood vessel images composed of linearized blood vessels (hereinafter referred to as blood vessel lines), and sends binary blood vessel image data corresponding to the selected binary blood vessel images to the authentication section 123.

The authentication section 123 generates the binary blood vessel image data DD as reference characteristic data RC of a predetermined form, and sends the same to the control section 120.

When the control section 120 receives the reference characteristic data RC from the authentication section 123 by controlling the blood vessel image pickup drive section 121, the image processing section 122 and the authentication section 123 in this way, it registers the registration authentication information RC in the flash memory FM, and cancels the control of the blood vessel image pickup drive section 121, the image processing section 122 and the authentication section 123 to stop the blood vessel image pickup section 102.

The control section 120 can execute the blood vessel registration mode in this way.

On the other hand, if the control section 120 is given the command COM2 of execution of the authentication mode from the operation section (not shown), it changes the operation mode to the authentication mode to control the blood vessel image pickup drive section 121, the image processing section 122 and the authentication section 123 based on a corresponding program stored in the ROM, and reads reference characteristic data RC registered in the flash memory FM and sends the same to the authentication section 123. The control section 120 displays the specifics of the control on the display section 124 as appropriate.

In this case, the blood vessel image pickup drive section 121 activates the blood vessel image pickup section 102 in the same manner as in the above-mentioned blood vessel registration mode. The image processing section 122 subjects blood vessel image signals SA (SA1 to SAn) sequentially output from the blood vessel image pickup section 102 to various kinds of processing in the same manner as in the above-mentioned blood vessel registration mode, and sends resultant binary blood vessel image data DD to the authentication section 123.

The authentication section 123 checks a formation pattern of blood vessel lines in the binary blood vessel image based on the binary blood vessel image data DD against a formation pattern of the binary blood vessel image based on reference characteristic data RC read from the flash memory FM by the control section 120.

The authentication section 123 determines whether the image pickup subject imaged by the blood vessel image pickup section 102 is a registrant according to the matching degree, and sends the result of the determination to the control section 120 as determination data D1.

When the control section 120 receives the determination data D1 from the authentication section 123 by controlling the blood vessel image pickup drive section 121, the image processing section 122 and the authentication section 123 in this way, it transfers the determination data D1 to the outside via an external interface IF, and cancels the control of the blood vessel image pickup drive section 121, the image processing section 122 and the authentication section 123 to stop the blood vessel image pickup section 2.

The control section 120 can execute the authentication mode in this way.

In this way, the authentication apparatus 101 performs biological authentication to determine existence/nonexistence of the genuine person (registrant) using, as an authentication object, peculiar blood vessels existing in the interior of an organism, whereby not only direct piracy from the organism but also the disguise of a registrant by a different person can be prevented compared to the case where a fingerprint or the like on the surface of the organism is used.

In addition to such a configuration, the authentication apparatus 101 is provided with an update notification capability of providing notification that reference characteristic data should be updated, and in practice, the control section 120 appropriately controls the authentication section 123, the display section 124 and the flash memory FM to perform update notification processing.

That is, in the authentication section 123, the control section 120 checks binary blood vessel image data DD supplied from the image processing section 122 during the authentication mode against reference characteristic data RC read from the flash memory FM using a predetermined a cross-correlation function.

If a cross-correlation value obtained in the authentication section 123 as the checking result meets at least a threshold initially set in advance as a minimum criterion for determining the subject to be a registrant (hereinafter referred to as registrant determination threshold), the control section 120 generates the cross-correlation value as history data BGD1, and stores the same in the flash memory FM.

In this way, the control section 120 sequentially holds cross-correlation values with the checking result equal to or greater than the registrant determination threshold in the flash memory FM as history data BGD2, BGD3, ..., BGDn until a preset number is reached.

When the control section 120 holds such a set number of history data BGD (BGD1 to BGDn), it updates the then oldest history data BGD to a cross-correlation value with the checking result equal to or greater than the registrant determination threshold if such a cross-correlation value is obtained during the subsequent authentication mode.

Further, when the control section 120 holds such a set number of history data BGD (BGD1 to BGDn), it detects the coming of a time for update of reference characteristic data RC according to the level of variations with respect to the registrant determination threshold (hereinafter referred to as counter-threshold variation degree) in each cross-correlation value based on history data BGD then held in the flash memory FM during the subsequent authentication mode, and displays a message of notification that reference characteristic data RC should be updated, e.g. "Change reference characteristic data immediately" on the display section 124.

In practice, where an average (hereinafter referred to as ideal average) of an ideal similarity degree distribution of reference characteristic data RC (hereinafter referred to as ideal similarity degree distribution) is $\mu 0$, a standard deviation (hereinafter referred to as ideal standard deviation) is $\sigma 0$, and the registrant determination threshold T0, a Mahalanobis distance from the ideal average $\sigma 0$ to the registrant determination threshold T0 (hereinafter referred to as ideal Mahalanobis distance) calculated according to the following formula (15) and an allowable error from the ideal Mahalanobis distance d0 are stored in the control section 120 for detection of the counter-threshold variation degree.

$$do = \frac{\mu o - To}{\sigma o} \tag{15}$$

In this connection, the similarity degree distribution is a distribution of checking results determined to be an identification object as described above. For the ideal average $\mu 0$ and the ideal standard deviation $\sigma 0$, for example, values determined from an average and a standard deviation of an actual similarity degree distribution of reference characteristic data RC in a plurality of subjects may be employed, and the allowable error may be determined based on, for example, a probability that a permanent change, such as a change with age, occurs in the image pickup device or identification object itself to contribute to the FRR (false rejection ratio).

Where an average (hereinafter referred to as comparative object average) of cross-correlation values based on n history data BGD then held in the flash memory FM is $\mu$, a standard deviation (hereinafter referred to as comparative object standard deviation) is $\sigma$, and the cross-correlation value is ri, the control section 120 calculates the comparative object average $\mu$ and the comparative object standard deviation $\sigma$ according to the following formula (16) as comparative objects of the ideal average $\mu 0$ and the ideal standard deviation $\sigma 0$.

$$\begin{array}{c} \mu = \frac{1}{n}\sum_{i=1}^{n} ri \\ \sigma = \sqrt{\frac{1}{n-1}\sum_{i=1}^{n}(x_i - \mu)^2} \end{array} \tag{16}$$

However, the comparative object standard deviation $\sigma$ is calculated based on the unbiased variance.

The control section 120 uses the comparative average $\mu$ and the comparative standard deviation $\sigma$ calculated according to the formula (16) to calculate a Mahalanobis distance (hereinafter referred to as comparative Mahalanobis distance) d from the comparative average $\mu$ to the registrant determination threshold T0 according to the following formula (17):

$$d = \frac{\mu - T0}{\sigma} \tag{17}$$

and displays a message of notification that reference characteristic data RC should be updated on the display section 124 if a difference between the comparative Mahalanobis distance d and the ideal Mahalanobis distance d0 is within an allowable error range stored in advance.

In this way, the control section 120 detects the coming of a time for update of reference characteristic data RC according to the level of a gap between a distribution state of cross-correlation values with respect to the registrant determination threshold T0 and a previously determined ideal distribution state, and displays a message of notification that the reference characteristic data RC should be updated on the display section 124.

(2) Update Notification Processing Procedure

Figure 21:
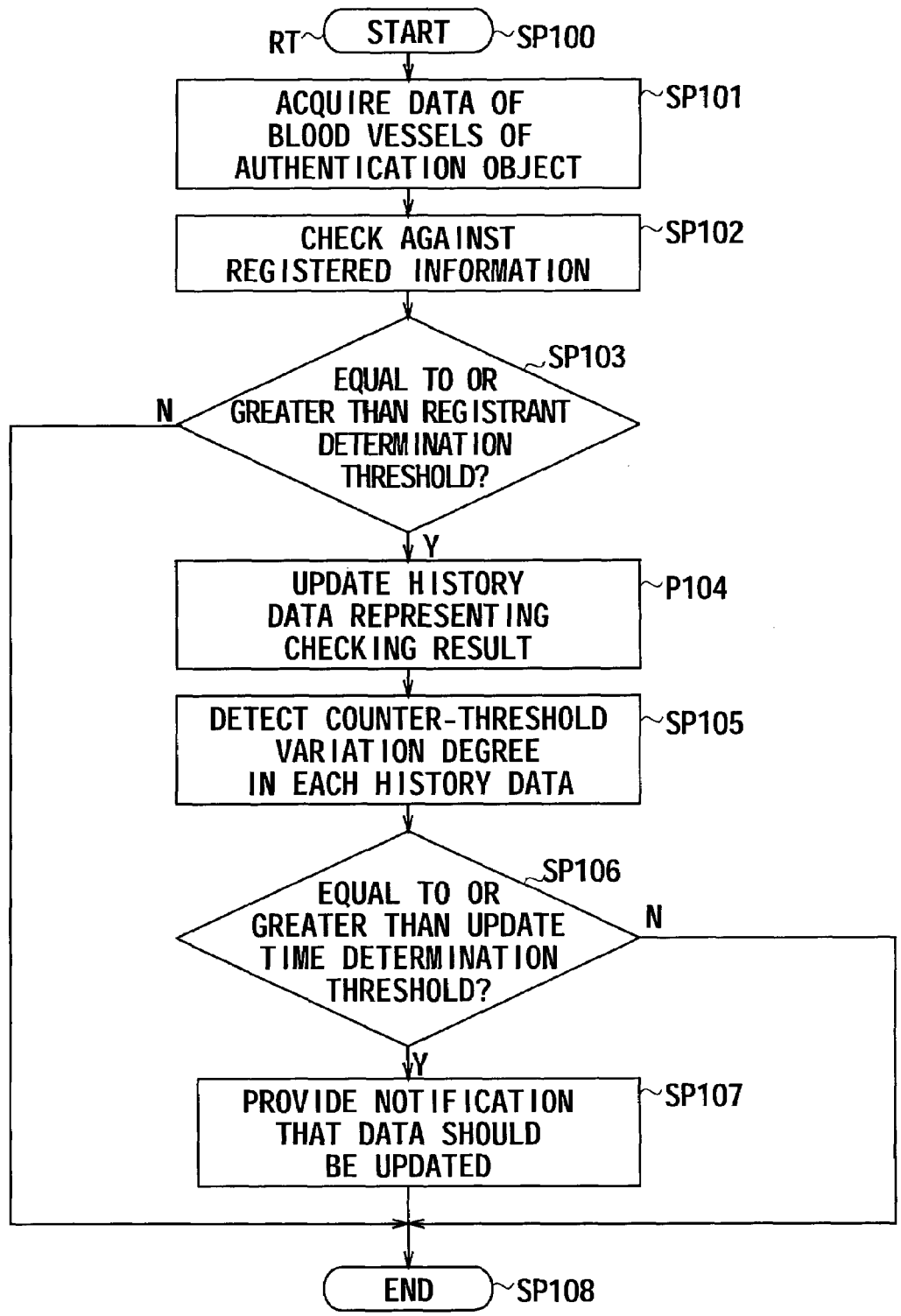
FIG. 21 is a flowchart showing an update notification processing procedure.
Figure 22:
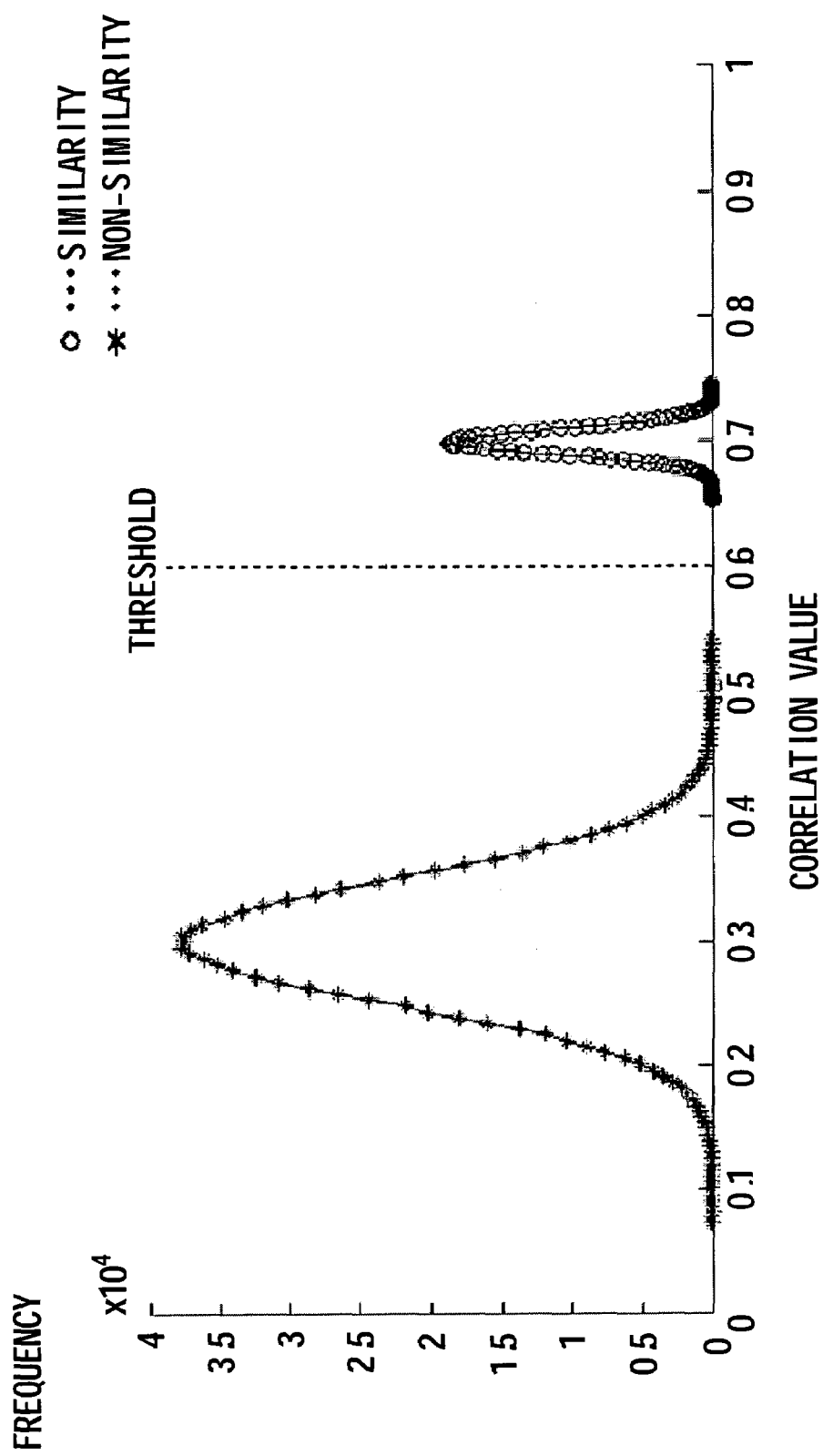
FIG. 22 is a schematic line diagram showing an ideal similarity distribution.
Figure 23:
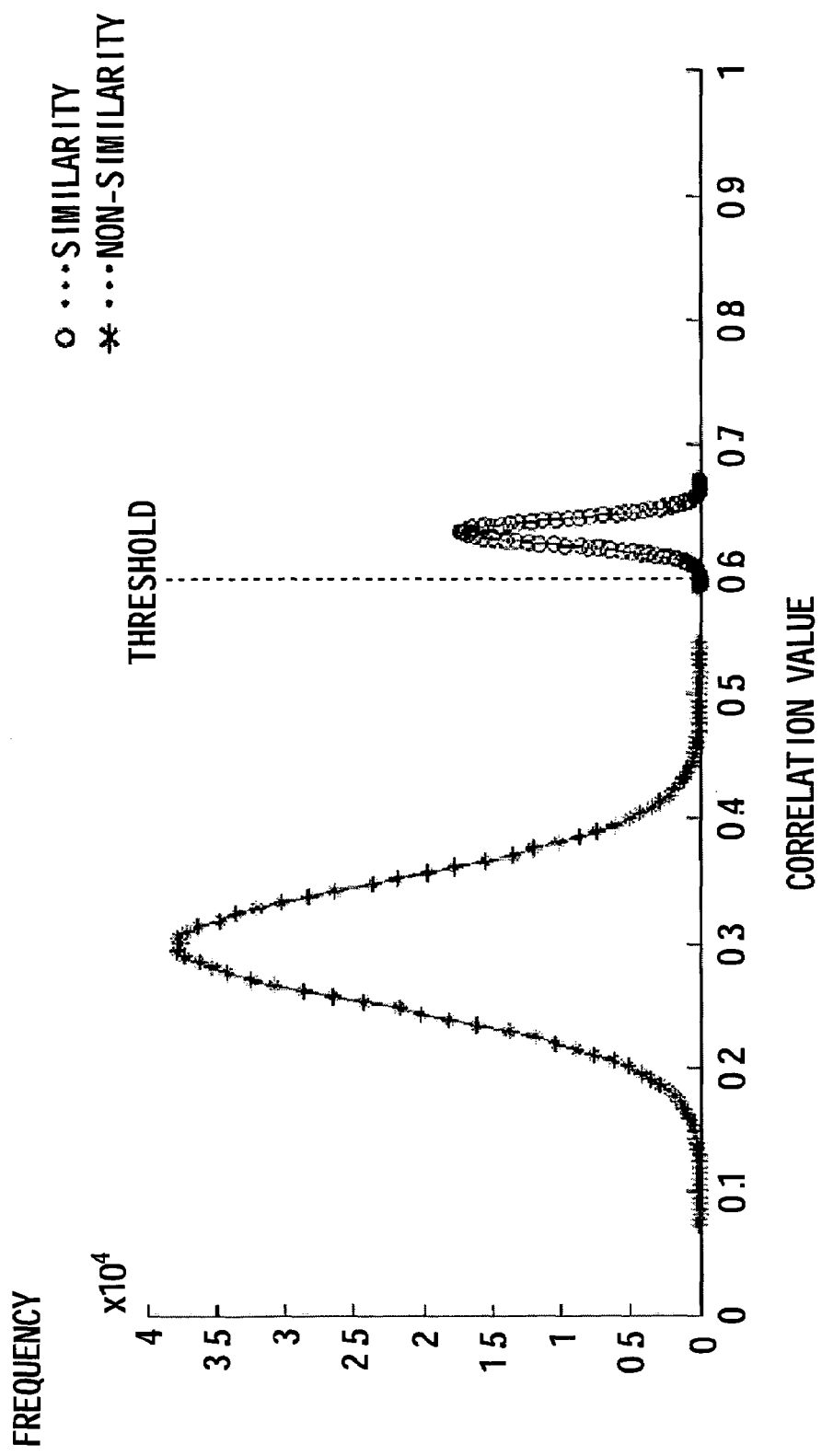
FIG. 23 is a schematic line diagram showing a change (1) in similarity distribution.
Figure 24:
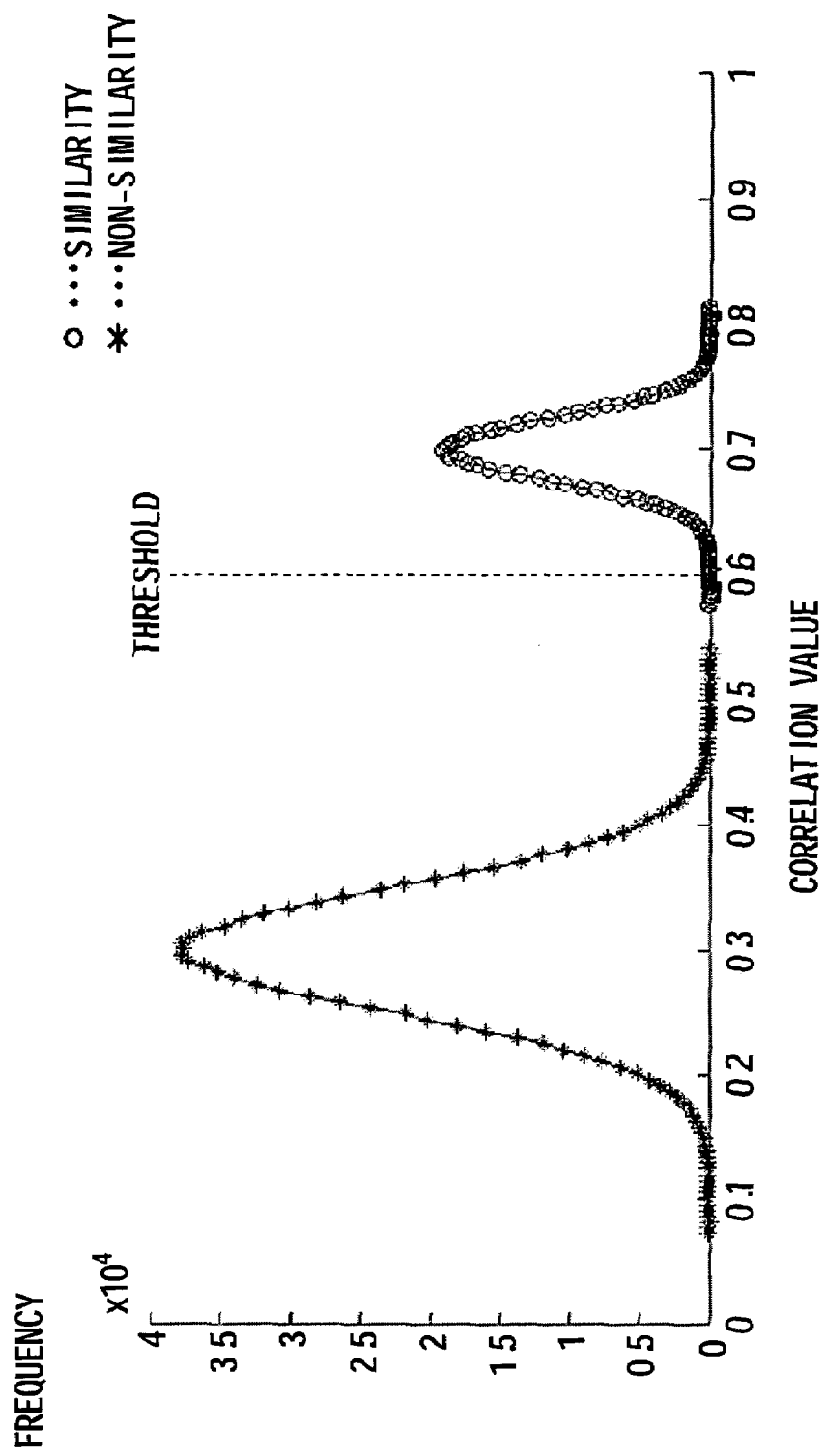
FIG. 24 is a schematic line diagram showing a change (2) in similarity distribution.

One example of the procedure in the update notification processing described above will now be described using the flowchart shown in FIG. 21. However, FIG. 21 shows a procedure after a preset number of history data BGD (BGD1 to BGDn) are held in the flash memory FM.

That is, when the control section 120 is given the command COM2 of execution of the authentication mode from the operation section (not shown), it starts the update notification processing procedure RT at step SP100, acquires blood vessels of the authentication object as binary blood vessel image data DD at this time at subsequent step SP101, checks the binary blood vessel image data DD against reference characteristic data RC previously registered in the flash memory FM at subsequent step SP102, and determines whether the checking result is equal to or greater than the registrant determination threshold or not at subsequent step SP103.

If the control section 120 determines that the checking result is less than the registrant determination threshold at step SP103, it means that the authentication object from which the binary blood vessel image data DD is acquired has blood vessels obviously different from blood vessels of the registrant at this time, and therefore in this case, processing proceeds to step SP104, where the update notification processing procedure RT is ended.

On the other hand, if the control section 120 determines that the checking result is equal to or greater than the registration determination threshold at step SP103, it means that the authentication object from which the binary blood vessel image data DD is acquired has blood vessels identical or equivalent to blood vessels of the registrant at this time, and therefore in this case, the control section 120 updates the cross-correlation value of the history data BGD stored earliest, of history data BGD representing the checking result, to a cross-correlation value (checking result) obtained at this time at subsequent step SP105.

The control section 120 reads history data BGD held in the flash memory FM and calculates the level of variations with respect to the registrant determination threshold (counter-threshold variation degree) in the cross-correlation values of the history data BGD at subsequent step SP106, and determines whether the detection result is equal to or greater than the update time determination threshold or not at subsequent step SP107.

If the control section 120 determines that the detection result is less than the update time determination threshold at step SP107, it means that a permanent change such as a change with age does not occur in the image pickup device or identification object itself or a permanent change occurs but it is so small that the reliability can be maintained, and therefore in this case, processing proceeds to subsequent step SP104, where the update notification processing procedure RT is ended.

On the other hand, if the control section 120 determines that the detection result is equal to or greater than the update time determination threshold step SP107, it means that a permanent change occurs to the extent that the reliability is impaired, and therefore in this case, the control section 120 displays a message of notification that the reference characteristic data RC should be updated on the display section 124 at subsequent step SP108, and then processing proceeds to SP104, where the update notification processing procedure RT is ended.

In this way, the control section 120 can perform update notification processing.

(3) Operation and Effect

In the configuration described above, the authentication apparatus 101 holds a plurality of cross-correlation values equal to or greater than the registrant determination threshold, among values of cross-correlation between the reference characteristic data RC and the binary blood vessel image data DD as an object to be compared therewith, in the flash memory FM as history data BGD (BGD1 to BGDn).

The authentication apparatus 101 detects a time for update of the reference characteristic data RC according to the degree of the cross-correlation values based on the history data BGD (BGD1 to BGDn) with respect to the registrant determination threshold.

Thus, in this authentication apparatus 101, a permanent change rather than a temporary change in the identification object, image pickup device or the like can be selectively detected, reference characteristic data can be therefore updated appropriately, and resultantly the reliability of the reference characteristic data can be improved. In addition, the FRR can be appropriately improved, and resultantly the reliability of authentication accuracy can also be improved.

According to the configuration described above, the degree of the cross-correlation values based on the history data BGD (BGD1 to BGDn) with respect to the registrant determination threshold is detected, and notification that registration authentication information RC should be updated is provided according to the detection result, whereby a permanent change rather than a temporary change in the identification object, image pickup device or the like can be selectively detected, reference characteristic data can be therefore updated appropriately, and resultantly the authentication apparatus 101 capable of improving the reliability of reference characteristic data can be achieved.

(4) Other Embodiments

In the embodiments described above, blood vessels existing in the organism are applied as an identification object, but the present invention is not limited thereto, and various other authentication objects such as, for example, nerves existing in the organism, fingerprints existing on the surface of the organism, or patterns of paper called textured patterns may be applied. In this connection, in the case of using nerves as an authentication object, nerves can be used as an authentication object in the same manner as in the embodiments described above if, for example, a marker peculiar to the nerve is injected into the body and the marker is imaged.

In the embodiments described above, the flash memory FM is applied as a holding means for holding as history information a plurality of checking results meeting at least a minimum criterion for determining the object to be the identification object among checking results, but the present invention is not limited thereto, and various other holding means such as, for example, HDDs (hard disk drives) and detachably attachable MEMORY STICK (registered trademark of Sony Corportaion) may be broadly applied.

In the embodiments described above, the holding means is provided in the authentication apparatus 101, but the present invention is not limited thereto, and the holding means may be connected via a transmission path as a separate body independent of the authentication apparatus 101.

In the embodiments described above, both history information (history data BGD) and registration information (reference characteristic data RC) is held in the holding means, but the present invention is not limited thereto, and such information may be held separately.

Further, in the embodiments described above, as detection means for detecting the coming of a time for update of reference characteristic data according to the level of variations of history information with respect to the minimum criterion, the coming of a time for update of reference characteristic data RC is detected according to the level of a gap between the distribution state of cross-correlation values with respect to the registrant determination threshold T0 and the ideal distribution state determined in advance, but the present invention is not limited thereto, and other various detection methods may be applied, such as a detection method in which the coming of a time for update of reference characteristic data RC according to the level of a gap between the distribution state of cross-correlation values with respect to the registrant determination threshold T0 and the distribution state of cross-correlation values previously or second previously determined instead of the ideal distribution state determined in advance.

Further, in the embodiments described above, notification that reference characteristic data (reference characteristic data RC) stored in the flash memory FM should be updated is provided according to the level of variations of history information with respect to the minimum criterion, but the present invention is not limited thereto, and the reference characteristic data (reference characteristic data RC) itself may be modified to automatically update the reference characteristic data. For the modification method, for example a method employed in the above-mentioned Patent Document 1, and the like may be applied.

However, if the method in which notification that reference characteristic data should be updated is provided is employed, there is an advantage that a situation in which reference characteristic data approximates reference characteristic data corresponding to a different identification object as the reference characteristic data is repeatedly modified can be reliably avoided. If the method in which notification that reference characteristic data should be updated is provided is employed with the present invention, a situation in which the user is made to update the reference characteristic data frequently can be avoided in view of the advantage of the present invention that "a permanent change rather than a temporary change in the identification object, image pickup device or the like can be selectively detected", and therefore application of the method to the present invention is particularly effective.

The present invention is applicable to a system performing authentication based on biological information.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for identity authentication, said apparatus comprising:
  a threshold determining section for determining a threshold value, X, associated with a predetermined organism;
  a memory for storing said threshold; and
  an authentication means section for comparing inspection characteristic data with the threshold value read from said memory to perform identity authentication on an organism to be inspected, wherein
  said inspection characteristic data is acquired from the organism to be inspected;
  said threshold value X satisfies following Equation, $$\frac{|X - \mu t|}{\sigma t} = \frac{|X - \mu o|}{\sigma o}$$

where,
  $\mu t$ is an average value of a plurality of first correlation values each generated by detecting correlation between reference data associated with said predetermined organism and a plurality of first characteristic data previously acquired from said predetermined organism;
  $\mu o$ is an average value of a plurality of second correlation values each generated by detecting correlation between said reference data and a plurality of second characteristic data previously acquired from an organism other than said predetermined organism;
  $\sigma t$ is a standard deviation of said plurality of first correlation values;
  $\sigma o$ is a standard deviation of said plurality of second correlation values; and
  the threshold determining section determines the threshold value based on a first normal distribution specified by said plurality of first correlation values, a second normal distribution specified by said plurality of second correlation values, and, when said second normal distribution is line-asymmetric, a third normal distribution specified to be line-symmetric using a pattern located on the side of said first normal distribution with respect to the maximum frequency of said second normal distribution.

2. A method for identity authentication, said method comprising:
  a first step of determining, with a threshold determining section of an authentication apparatus, a threshold value, X, associated with a predetermined organism; and
  a second step of comparing, with an authentication section of said authentication apparatus, said inspection characteristic data with said threshold value determined in said first step to perform identity authentication on an organism to be inspected, wherein.
  said inspection characteristic data is acquired from the organism to be inspected;
  said threshold value X satisfies following Equation, $$\frac{|X - \mu t|}{\sigma t} = \frac{|X - \mu o|}{\sigma o}$$

where,
  $\mu t$ is an average value of a plurality of first correlation values each generated by detecting correlation between reference data associated with said predetermined organism and a plurality of first characteristic data previously acquired from said predetermined organism;
  $\mu o$ is an average value of a plurality of second correlation values each generated by detecting correlation between said reference data and a plurality of second characteristic data previously acquired from an organism other than said predetermined organism;
  $\sigma t$ is a standard deviation of said plurality of first correlation values;
  $\sigma o$ is a standard deviation of said plurality of second correlation values; and
  the threshold determining section determines the threshold value based on a first normal distribution specified by said plurality of first correlation values, a second normal distribution specified by said plurality of second correlation values, and, when said second normal distribution is line-asymmetric, a third normal distribution specified to be line-symmetric using a pattern located on the side of said first normal distribution with respect to the maximum frequency of said second normal distribution.

* * * * *